United States Patent
Jeng

(10) Patent No.: US 7,077,771 B2
(45) Date of Patent: Jul. 18, 2006

(54) AUTOMATIC STEPLESS SPEED-CHANGING MECHANISM

(76) Inventor: Fu-shen Jeng, 5 Fl., No. 32, Sec. 1, Huanhe E. Rd., Yunghe City, Taipei Hsien (TW)

(*) Notice: Subject to any disclaimer, the term of this patent is extended or adjusted under 35 U.S.C. 154(b) by 238 days.

(21) Appl. No.: 10/234,518

(22) Filed: Sep. 5, 2002

(65) Prior Publication Data

US 2004/0048706 A1    Mar. 11, 2004

(51) Int. Cl.
*F16H 9/10*    (2006.01)
(52) U.S. Cl. .............................. 474/49; 474/50; 474/55
(58) Field of Classification Search ............ 474/47–49, 474/64, 50, 55; 280/259, 260, 236
See application file for complete search history.

(56) References Cited

U.S. PATENT DOCUMENTS

| | | | | |
|---|---|---|---|---|
| 3,956,944 A | * | 5/1976 | Tompkins | 474/50 |
| 4,342,559 A | * | 8/1982 | Williams | 474/50 |
| 4,591,351 A | * | 5/1986 | Kumm | 474/49 |
| 4,836,046 A | * | 6/1989 | Chappel | 474/56 |
| 4,892,507 A | * | 1/1990 | Patin et al. | 474/50 |
| 4,990,123 A | * | 2/1991 | Krude | 474/50 |
| 5,443,423 A | * | 8/1995 | Ha | 474/47 |
| 5,830,093 A | * | 11/1998 | Yanay | 474/49 |
| 5,984,814 A | * | 11/1999 | Davenport | 474/50 |
| 6,152,844 A | * | 11/2000 | Daugherty | 474/49 |

\* cited by examiner

*Primary Examiner*—Marcus Charles
(74) *Attorney, Agent, or Firm*—Bacon & Thomas PLLC

(57) ABSTRACT

An automatic stepless speed-changing mechanism mainly includes a pivotal shaft, a plurality of mounting discs mounted along the pivotal shaft and provided with radially extended guide rails, a plurality of axial rods separately axially extended through the guide rails to slide and rotate therein, a transmission gear, a restoring mechanism, and driving members mounted on the axial rods, and a transmission member wound around the driving members. The driving members are preferably gears, and the transmission member is preferably a chain. When the transmission member brings the driving members to move, the axial rods, which are connected to the driving members and the transmission gear and the restoring mechanism, are caused to slide within the guide rails, resulting in changes in a radius of turn of the driving members to provide the function of automatic stepless change of speed.

16 Claims, 26 Drawing Sheets

AUTOMATIC STEPLESS SPEED-CHANGING MECHANISM

FIELD OF THE INVENTION

The present invention relates to an automatic stepless speed-changing mechanism that mainly includes a pivotal shaft, a plurality of mounting discs mounted along the pivotal shaft and provided with radially extended guide rails, a plurality of axial rods extended through the guide rails to slide and rotate therein, transmission gear, restoring mechanism, and driving members connected to the axial rods, and a transmission member wound around the driving members.

BACKGROUND OF THE INVENTION

Taiwan Patent Publication No. 485221 discloses a continuously stepless speed-changing gear set, which mainly includes an input shaft, a high-speed gear set, a low-speed gear set, an output shaft, a first differential device connecting the input shaft to a driving wheel in the high-speed gear set and a driving wheel in the low-speed gear set, and a second differential device connecting the output shaft to a driven wheel in the high-speed gear set and a driven wheel in the low-speed gear set. Since the above-described conventional speed-changing gear set uses meshed gears to transmit force, it requires addition of heat-radiating oil to reduce a high amount of heat produced by gears at their contact points due to friction.

It is therefore tried by the inventor to develop an automatic stepless speed-changing mechanism to eliminate the drawbacks existed in the conventional stepless speed-changing gear set.

SUMMARY OF THE INVENTION

A primary object of the present invention is to provide a speed-changing mechanism that does not require addition of heat-radiating oil.

Another object of the present invention is to provide a speed-changing mechanism that is capable of automatically steplessly changing speed ratio.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 1A is an enlarged view of the encircled area of FIG. 1 to better show a structure thereat;

FIG. 2A is an enlarged view of the encircled area of FIG. 2 to better show a structure thereat;

FIG. 3A is an enlarged view of the encircled area of FIG. 3 to better show a structure thereat;

FIG. 9A is an enlarged view of the encircled area of FIG. 9 to better show a structure thereat;

FIG. 10A is an enlarged view of the encircled area of FIG. 10 to better show a structure thereat;

FIG. 11A is an enlarged view of the encircled area of FIG. 11 to better show a structure thereat;

FIG. 13A is an enlarged view of the encircled area of FIG. 13 to better show a structure thereat;

FIG. 14A is an enlarged view of the encircled area of FIG. 14 to better show a structure thereat;

FIG. 15A is an enlarged view of the encircled area of FIG. 15 to better show a structure thereat;

FIG. 17A is an enlarged view of the encircled area of FIG. 17 to better show a structure thereat;

FIG. 18A is an enlarged view of the encircled area of FIG. 18 to better show a structure thereat;

FIGS. 21A and 21B are enlarged views of the encircled areas of FIG. 21 to better show a structure thereat;

FIG. 22A is an enlarged view of the encircled area of FIG. 22 to better show a structure thereat;

FIGS. 23A and 23B are enlarged views of the encircled areas of FIG. 23 to better show a structure thereat;

DETAILED DESCRIPTION OF THE PREFERRED EMBODIMENTS

Figure 1:
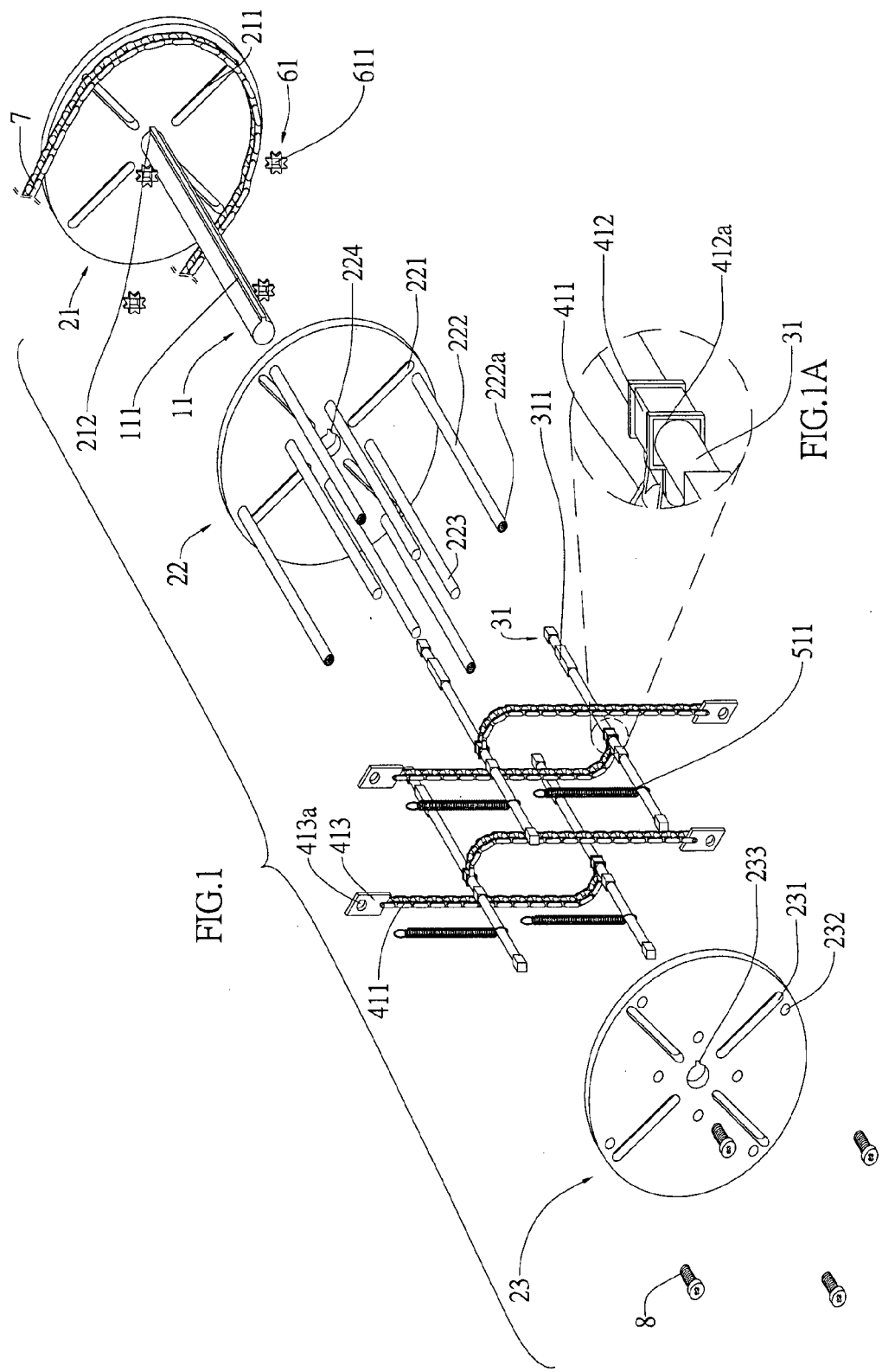
FIG. 1 is an exploded perspective view of an automatic stepless speed-changing mechanism according to a first embodiment of the present invention being applied to a driving gear, wherein chains and tension springs are respectively employed in a transmission gear and a restoring mechanism thereof.
Figure 2:
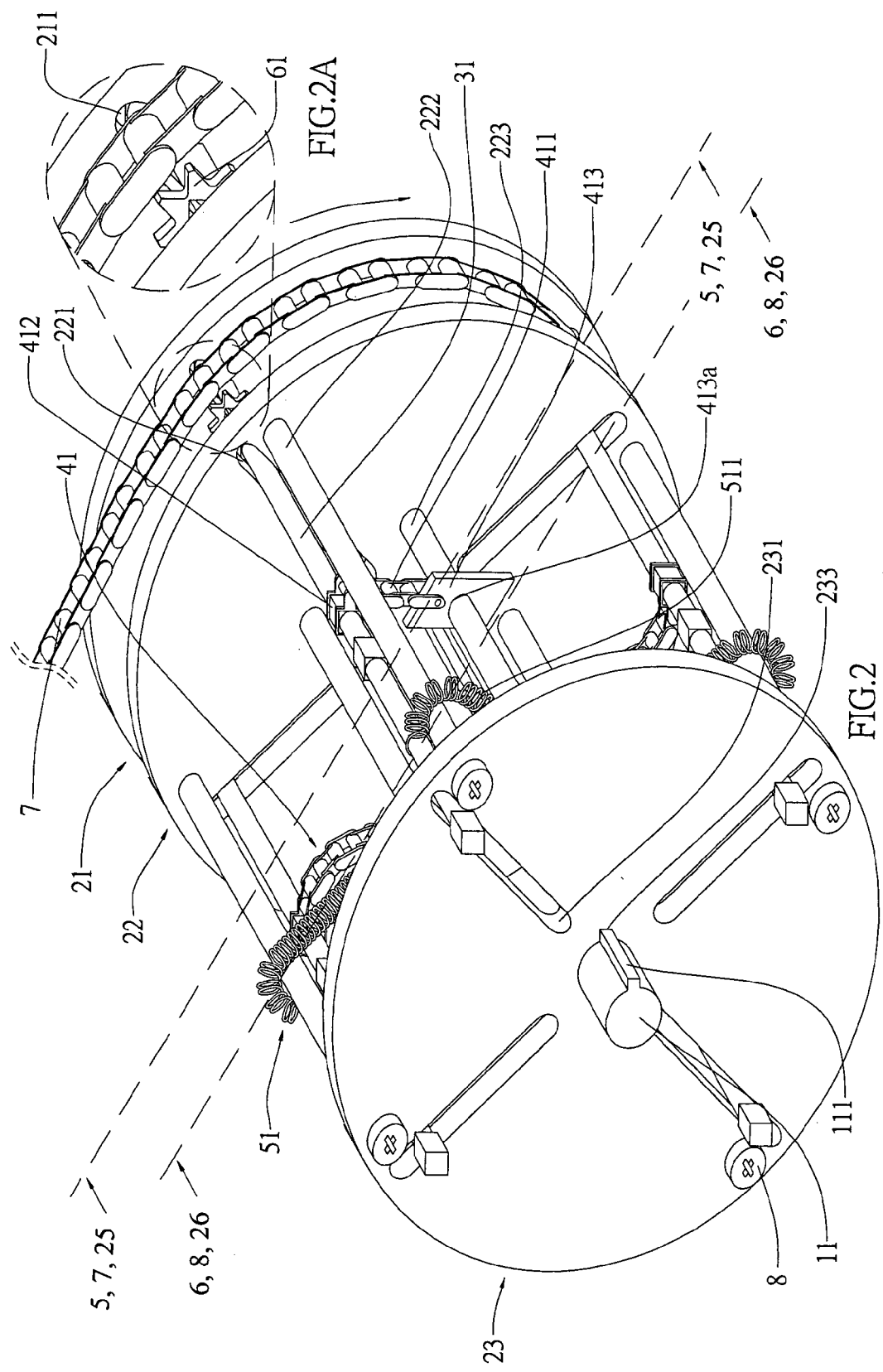
FIG. 2 is an assembled perspective view of FIG. 1.

Please refer to FIGS. 1 and 2 that are exploded and assembled perspective views, respectively, of an automatic stepless speed-changing mechanism according to a first embodiment of the present invention being applied to a driving gear. As shown, the speed-changing mechanism mainly includes a pivotal shaft 11 having an axially extended rib portion 111 provided along one side thereof; a plurality of (three are shown in the drawings) mounting discs 21, 22, 23 having recesses 212, 224, 233 corresponding to the rib portion 111, so that the pivotal shaft 11 extends through the mounting discs 21, 22, 23 with the rib portion 111 engaged with the recesses 212, 224, 233; a plurality of axial rods 31; and a transmission gear 41, a restoring mechanism 51, and driving members 61 connected to the axial rods 31 (see FIG. 2A).

The mounting discs 21, 22, 23 are provided with radially extended guide rails 211, 221, 231 corresponding to the axial rods 31 for the axial rods 31 to separately slide and rotate within the guide rails 211, 221, 231.

The transmission gear 41 includes a plurality of chains 411, a plurality of connectors 412 for connecting an end of the chains 411 to the axial rods 31 (see FIG. 1A), a plurality of connecting bars 223 provided on the mounting disc 22 that is an intermediate one of the three mounting discs 21, 22, 23, and a plurality of fastening members 413 for connecting another end of the chains 411 to the connecting bars 223. That is, each of the chains 411 has an end connected to the axial rod 31 via the connector 412, and another end to the connecting bar 223 via the fastening members 413.

The restoring mechanism 51 includes a plurality of tension springs 511, a plurality of fixing bars 222 provided on the intermediate mounting disc 22, and the plurality of connecting bars 223 provided on the intermediate mounting disc 22. Each of the tension springs 511 has an end connected to the axial rod 31, and another end passed by the connecting bar 223 to connect to the fixing bar 222.

A transmission member 7 is wound around the driving members 61.

To assemble the speed-changing mechanism of the first embodiment applied to a driving gear, first engage an engaging point 311 on each of the axial rods 31 with a fixing hole 611 provided on each driving member 61 (see FIGS. 1 and 2A). The axial rods 31 are then separately guided through the guide rails 211, 221, 231 on the mounting discs 21, 22, 23. Connect the connectors 412 to the axial rods 31 by engaging an engaging hole 412a of each connector 412 with the axial rod 31 (see FIG. 1A). Thereafter, connect an end of each chain 411 to one corresponding axial rod 31 via the connector 412 and another end of each chain 411 to one corresponding connecting bar 223 via an engaging hole 413a provided on each fastening member 413. Thereafter, connect an end of each tension spring 511 to one corresponding axial rod 31 and guide another end of each tension spring 511 through one corresponding fixing bar 222 to one corresponding connecting bar 223. Use fastening means 8, such as screws, to extend through holes 232 provided on the mounting disc 23, which is located at one outer side of the whole speed-changing mechanism, into internally threaded holes 222a provided in the fixing bars 222. Finally, wind the transmission member 7 around the driving members 61.

Figure 3:
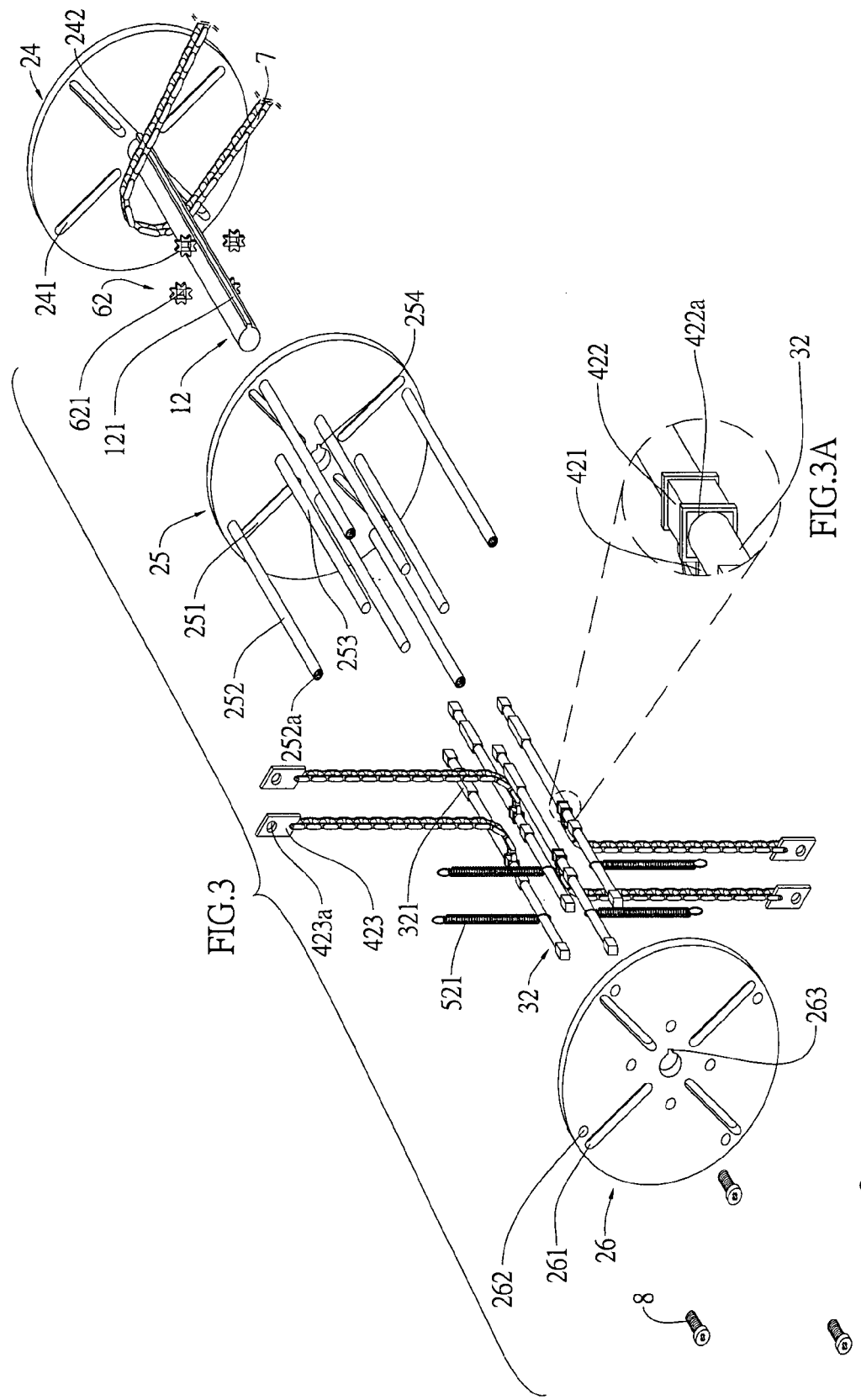
FIG. 3 is an exploded perspective view of the automatic stepless speed-changing mechanism according to the first embodiment of the present invention being applied to a driven gear.
Figure 4:
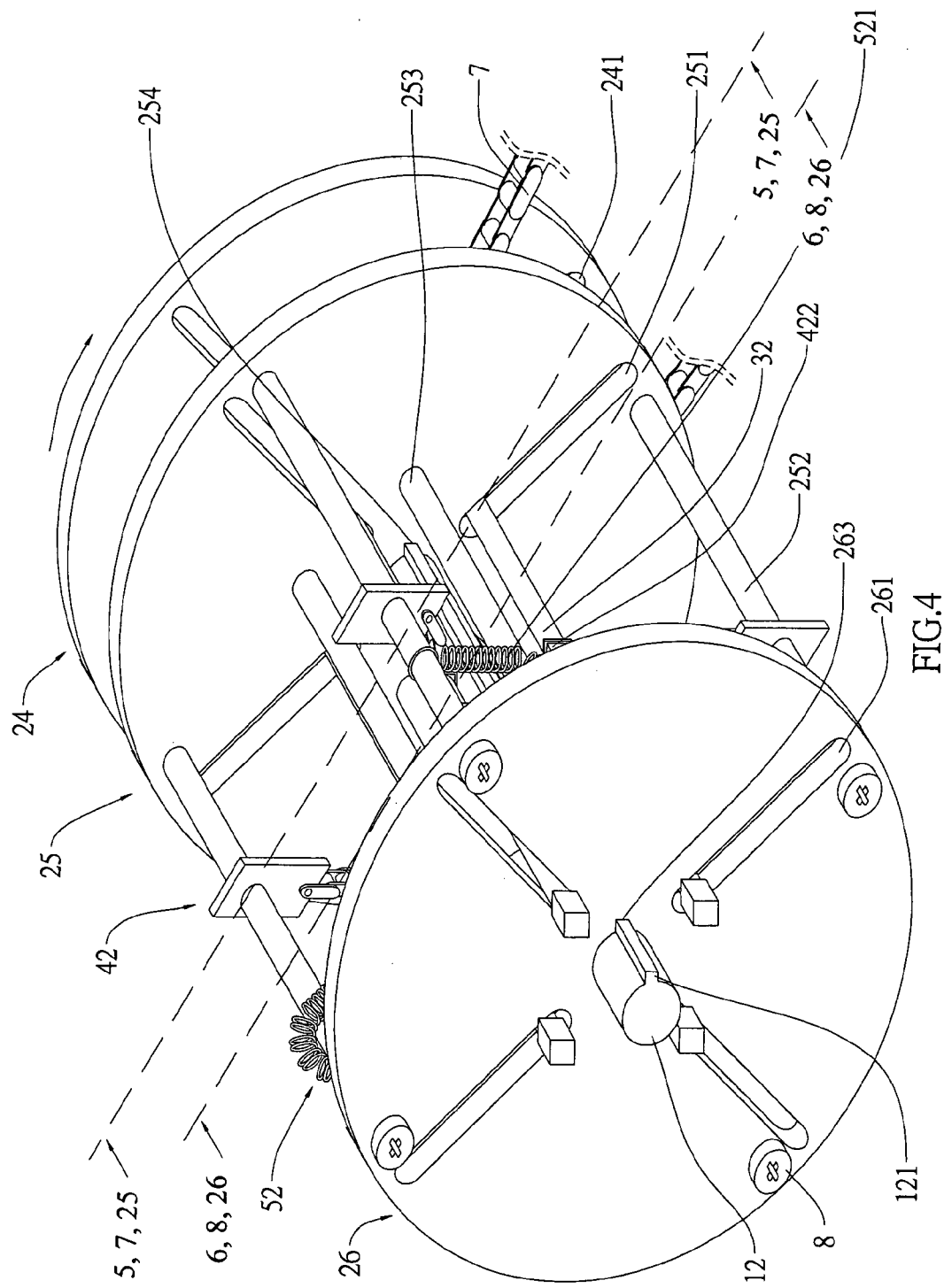
FIG. 4 is an assembled perspective view of FIG. 3.

Please refer to FIGS. 3 and 4 that are exploded and assembled perspective views, respectively, of the speed-changing mechanism according to the first embodiment of the present invention being applied to a driven gear. As shown, the speed-changing mechanism for applying to a driven gear mainly includes a pivotal shaft 12 having an axially extended rib portion 121 provided along one side thereof; a plurality of (three are shown in the drawings) mounting discs 24, 25, 26 having recesses 242, 254, 263 corresponding to the rib portion 121, so that the pivotal shaft 12 extends through the mounting discs 24, 25, 26 with the rib portion 121 engaged with the recesses 242, 254, 263; a plurality of axial rods 32; and a transmission gear 42, a restoring mechanism 52, and driving members 62 connected to the axial rods 32.

The mounting discs 24, 25, 26 are provided with radially extended guide rails 241, 251, 261 corresponding to the axial rods 32 for the axial rods 32 to separately slide and rotate within the guide rails 241, 251, 261.

The transmission gear 42 includes a plurality of chains 421, a plurality of connectors 422 for connecting the chains 421 to the axial rods 32 (see FIG. 3A), a plurality of fixing bars 252 provided on the mounting disc 25 that is an intermediate one of the three mounting discs 24, 25, 26, and a plurality of fastening members 423 for connecting the chains 421 to the fixing bars 252. Each of the chains 421 has an end connected to the axial rod 32 via the connector 422, and another end to the fixing bar 252 via the fastening members 423.

The restoring mechanism 52 includes a plurality of tension springs 521, the plurality of fixing bars 252 provided on the intermediate mounting disc 52, and a plurality of connecting bars 253 provided on the intermediate mounting disc 52. Each of the tension springs 521 has an end connected to the axial rod 32, and another end passed by the connecting bar 253 to connect to the fixing bar 252.

A transmission member 7 is wound around the driving members 62.

To assemble the speed-changing mechanism of the first embodiment applied to a driven gear, first engage an engaging point 321 on each of the axial rods 32 with a fixing hole 621 provided on each driving member 62. The axial rods 32 are then separately guided through the guide rails 241, 251, 261 on the mounting discs 24, 25, 26. Connect the connectors 422 to the axial rods 32 by engaging an engaging hole 422a of each connector 422 with the axial rod 32 (see FIG. 3A). Thereafter, connect an end of each chain 421 to one corresponding axial rod 32 via the connector 422 and another end of each chain 421 to one corresponding fixing bar 252 via an engaging hole 423a provided on each fastening member 423. Thereafter, connect an end of each tension spring 521 to one corresponding axial rod 32 and guide another end of each tension spring 521 through the connecting bar 253 to one corresponding fixing bar 252. Use fastening means 8, such as screws, to extend through holes 262 provided on the mounting disc 26, which is located at one outer side of the whole speed-changing mechanism, into internally threaded holes 252a provided in the fixing bars 252. Finally, wind the transmission member 7 around the driving members 62.

Figure 5:
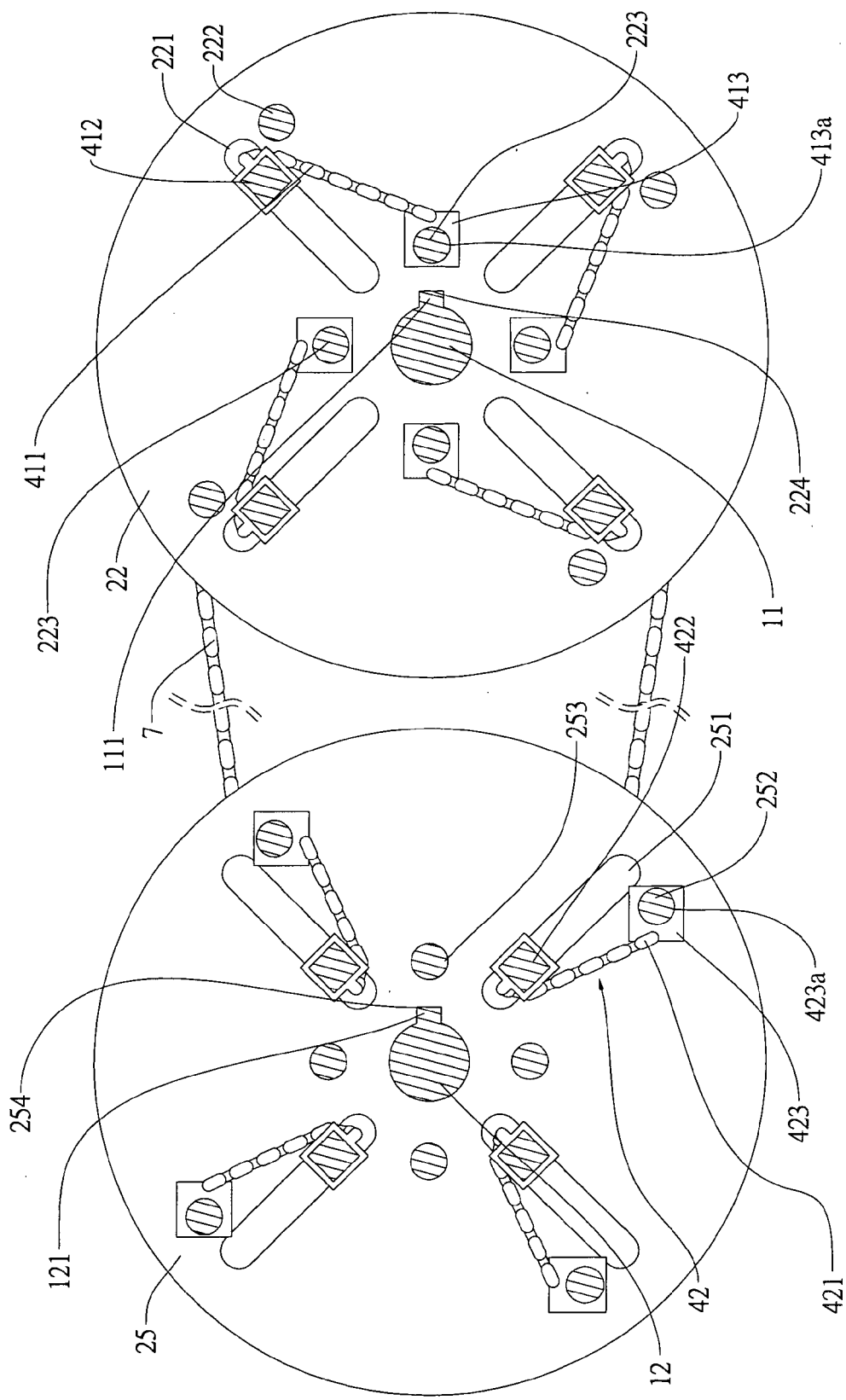
FIG. 5 is a sectioned side view taken along line 5—5 of FIGS. 2 and 4, with chains thereof in an initial state.
Figure 6:
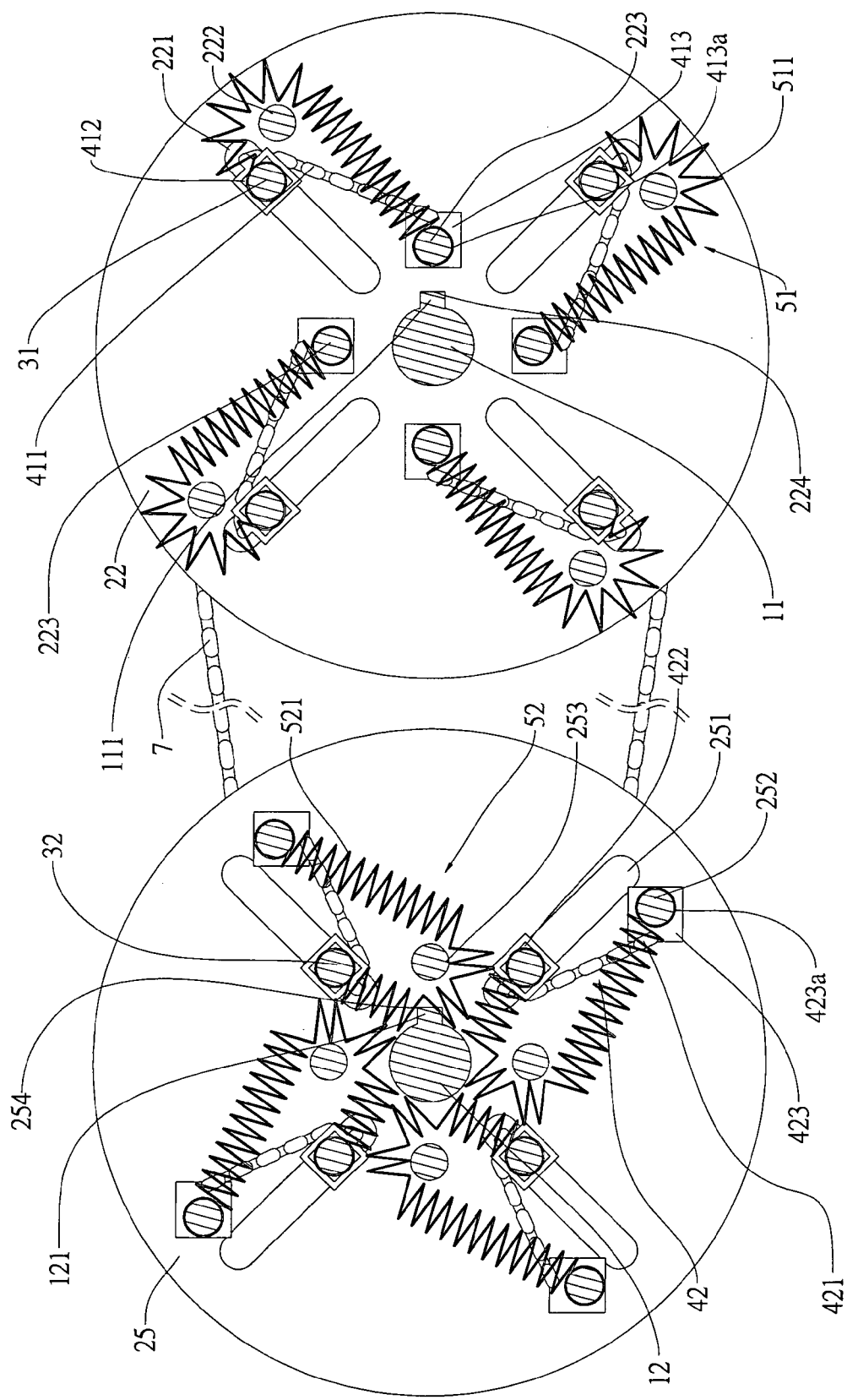
FIG. 6 is a sectioned side view taken along line 6—6 of FIGS. 2 and 4, with tension springs thereof in an initial state.

Please refer to FIGS. 5 and 6 that are sectioned side views taken along lines 5—5 and 6—6 of FIGS. 2 and 4 to show the chains and the tension springs, respectively, in an initial state. As shown, when the pivotal shaft 11 is turned clockwise, the rib portion 111 brings the mounting discs 21, 22, 23 to synchronously rotate clockwise, so that the axial rods 31 mounted on the mounting discs 21, 22, 23 and the driving members 61 engaged with the engaging points 311 of the axial rods 31 are turned clockwise at the same time. The transmission member 7 wound around the driving members 61 is brought by the driving member 61 to move, accordingly. Meanwhile, the driving members 62 that are also engaged with the transmission member 7 are brought to rotate clockwise, too. Since the axial rods 32, that are mounted on the mounting discs 24, 25, 26, are engaged with the driving members 62, they are brought to rotate the mounting discs 24, 25, 26 clockwise, too.

Figure 7:
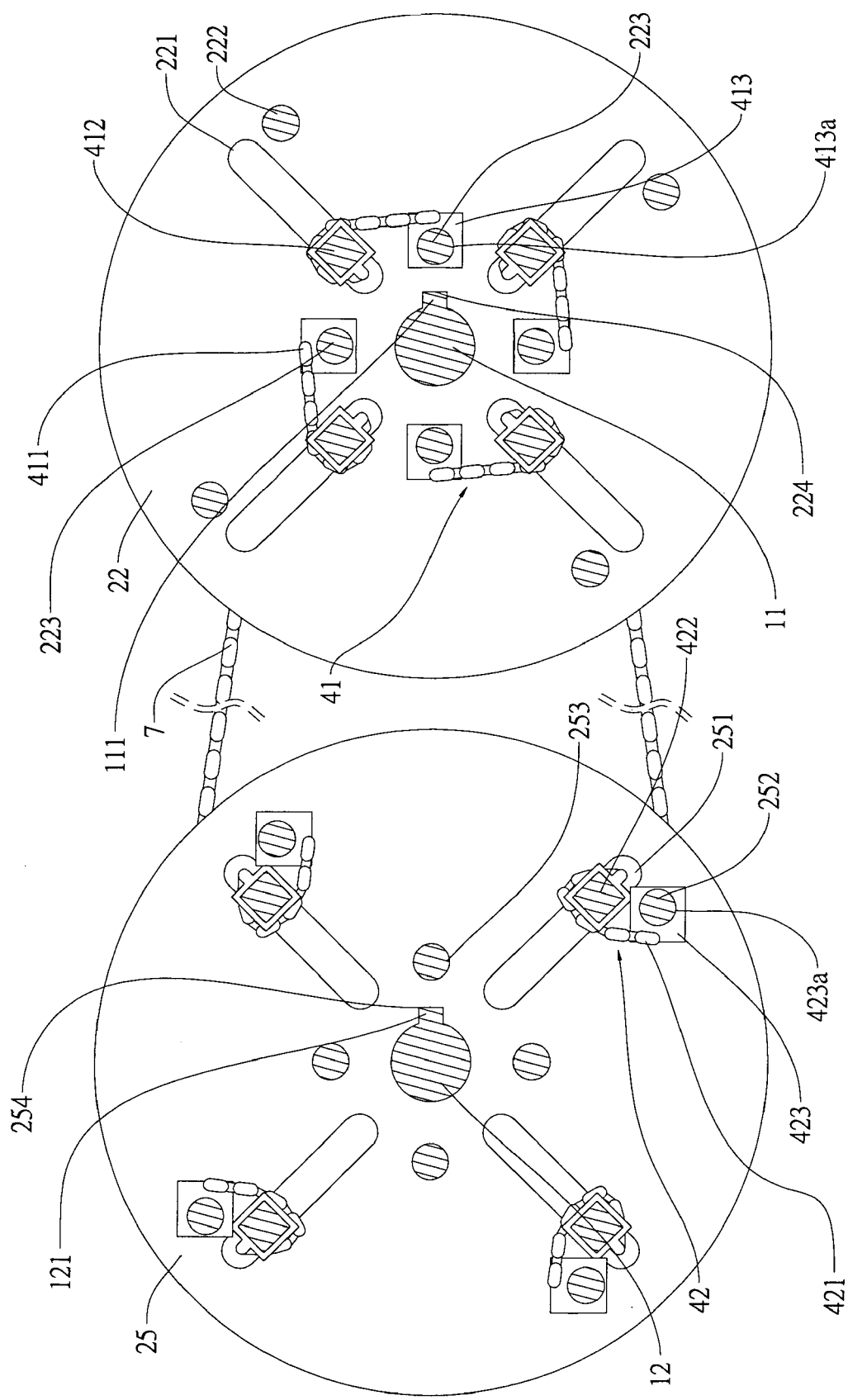
FIG. 7 is a sectioned side view taken along line 7—7 of FIGS. 2 and 4, with chains thereof in an operating state.
Figure 8:
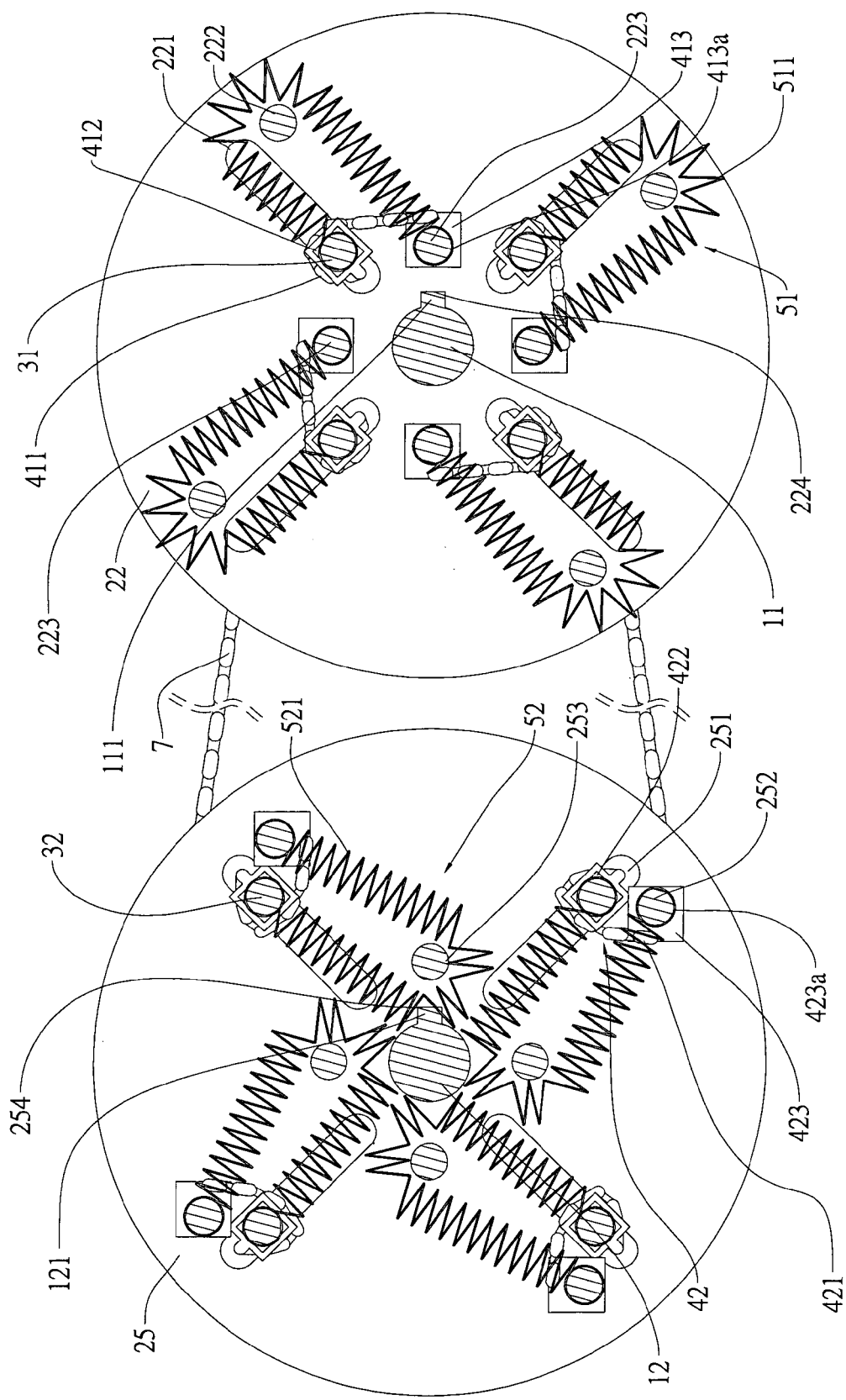
FIG. 8 is a sectioned side view taken along line 8—8 of FIGS. 2 and 4, with tension springs thereof in an operating state.

Please refer to FIGS. 7 and 8 that are sectioned side views taken along lines 7—7 and 8—8 of FIGS. 2 and 4 to show the chains and the tension springs, respectively, in an operating state. As shown, when the pivotal shaft 11 has an operating force smaller than a resisting force produced by the transmission member 7 (that is, a force needed to rotate the pivotal shaft 12), the driving members 61 engaged with the transmission member 7 are brought to rotate counterclockwise. Meanwhile, when the axial rods 31 engaged with the driving members 61 are brought by the latter to rotate counterclockwise, they are also brought by the transmission gear 41 to move along the guide rails 211, 221, 231 toward the pivotal shaft 11 to provide a decreased radius of turn and accordingly the function of automatic stepless change of speed ratio. However, when the pivotal shaft 11 produces an operating force larger than the resisting force produced by the transmission member 7, the restoring mechanism 51 mounted on the axial rods 31 would bring the axial rods 31 to the state shown in FIGS. 5 and 6.

When the transmission member 7 transmits a pull force, that is, a force produced by the operating pivotal shaft 11, is smaller than a force needed to rotate the pivotal shaft 12, the driving members 62 engaged with the transmission member 7 are brought to turn clockwise. When the axial rods 32 engaged with the driving members 62 are brought by the latter to rotate clockwise, they are also brought by the transmission gear 42 to move along the guide rails 241, 251, 261 toward outer peripheries of the mounting discs 24, 25, 26 to provide an increased radius of turn and accordingly the function of automatic stepless change of speed ratio. However, when the force needed to turn the pivotal shaft 12 is smaller than the pull force transmitted by the transmission member 7, the restoring mechanism 52 mounted on the axial rods 32 would bring the axial rods 32 to the state shown in FIGS. 5 and 6.

In the above-described structure, the driving members 61, 62 and the transmission members 7 may be of any type instead of being limited to the gears and chains shown in the illustrated embodiment and drawings; the transmission mechanisms 41, 42 maybe of any type instead of being limited to the chains 411, 421, the connectors 412, 422, the connecting bars 223, 253, the fixing bars 222, 252, or the fastening members 413, 423 shown in the illustrated embodiment and drawings; the restoring mechanisms 51, 52 may be of any type instead of being limited to the tension springs 511, 521, the fixing bars 222, 252, or the connecting bars 223, 253 shown in the illustrated embodiment and drawings.

Figure 9:
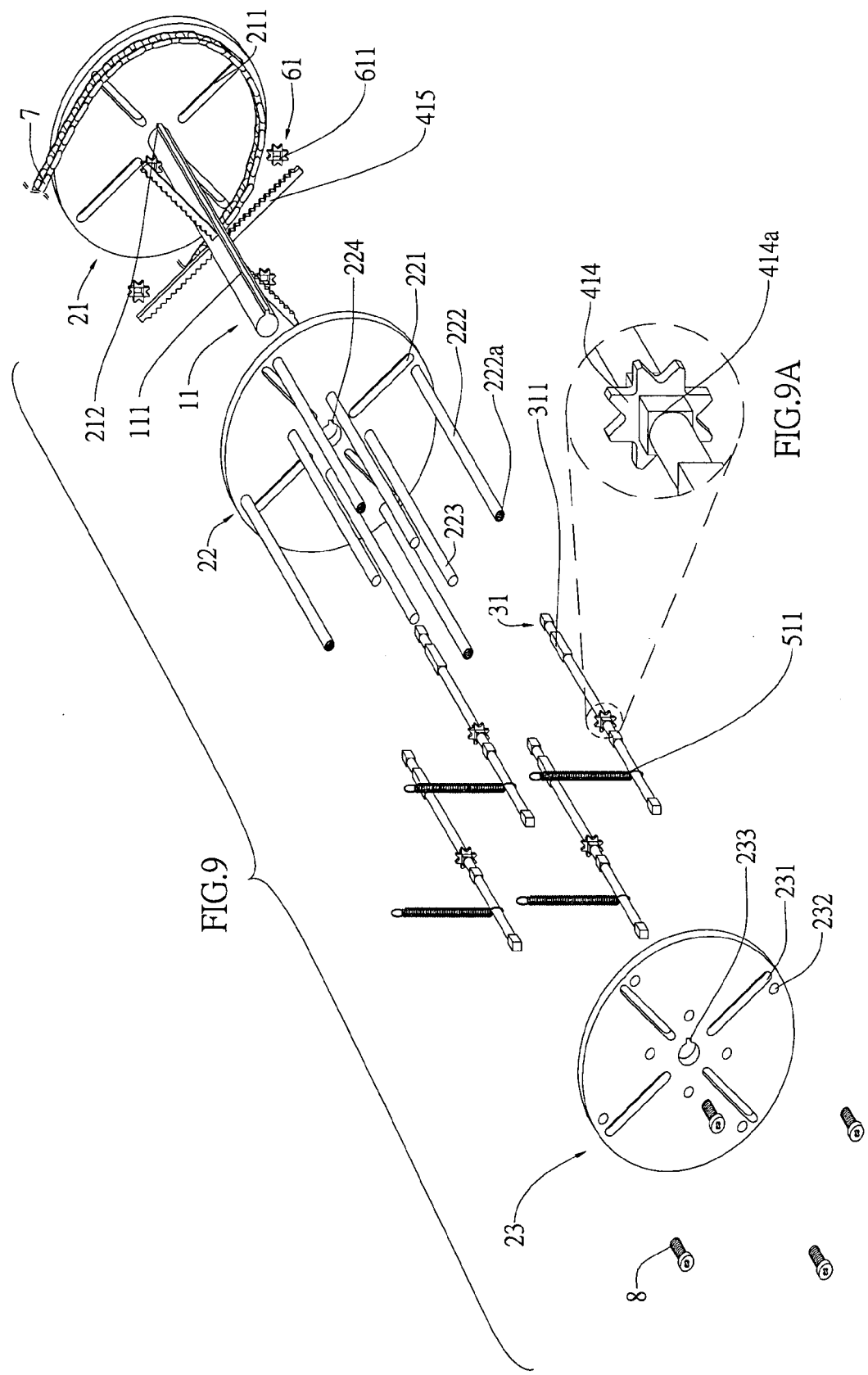
FIG. 9 is an exploded perspective view of an automatic stepless speed-changing mechanism according to a second embodiment of the present invention being applied to a driving gear, wherein gears and a rack are employed in a transmission gear thereof.
Figure 10:
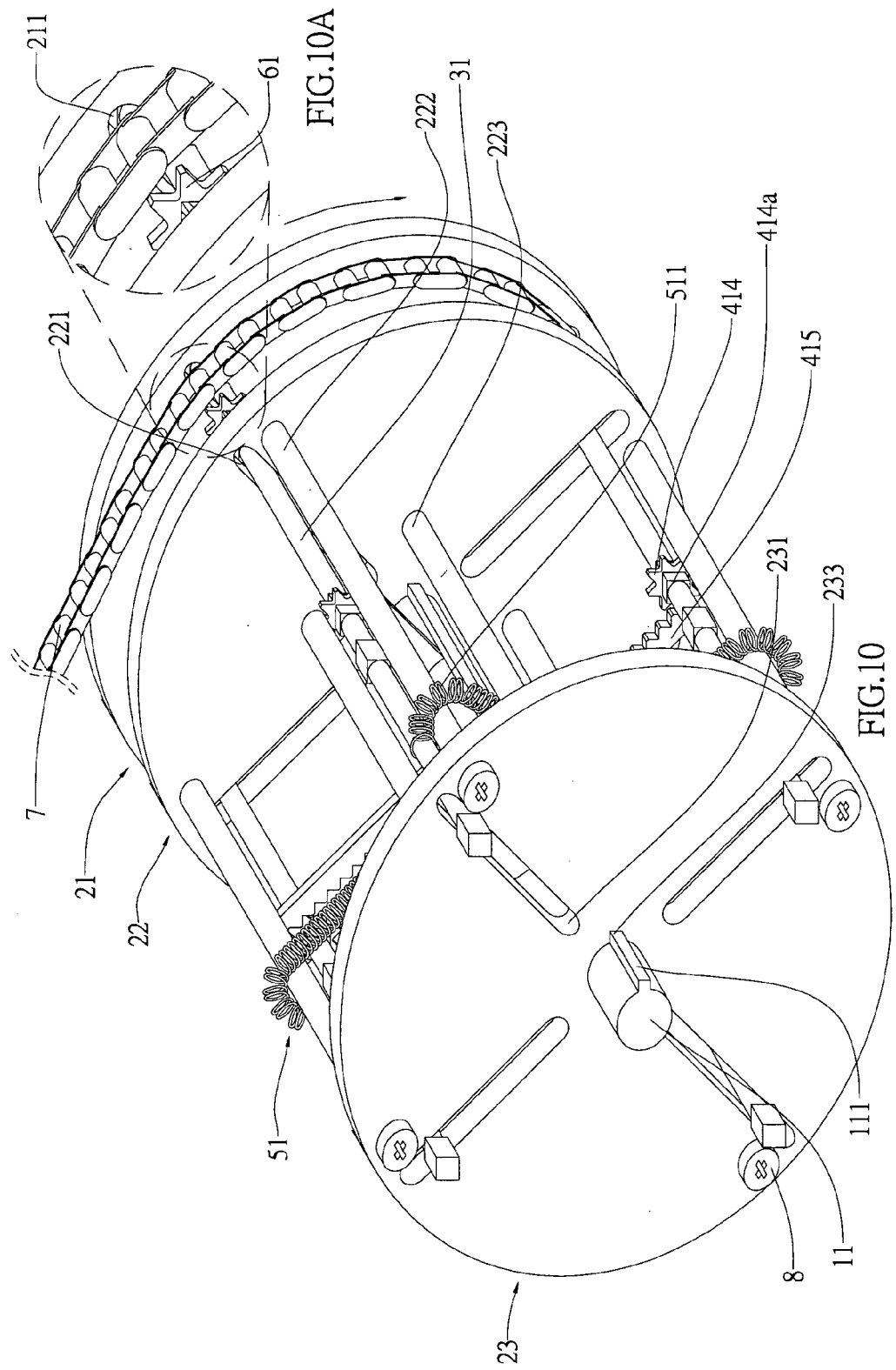
FIG. 10 is an assembled perspective view of FIG. 9.

Please refer to FIGS. 9 and 10 that are exploded and assembled perspective views, respectively, of an automatic stepless speed-changing mechanism according to a second embodiment of the present invention being applied to a driving gear. As shown, this second embodiment is generally structurally similar to the first embodiment, except that a transmission gear 41 thereof includes gears 414 mounted on the axial rods 31 (see FIG. 9A) and a rack 415 mounted on the pivotal shaft 11. A restoring mechanism 51 thereof also includes tension springs 511, fixing bars 222 mounted on the mounting discs 22, and connecting bars 223 mounted on the mounting discs 22, with an end of the tension springs 511 connected to the axial rods 31 and another end passed by the fixing bars 222 to connect to the connecting bars 223. And, a transmission member 7 is wound around driving members 61 (see FIG. 10A).

To assemble the speed-changing mechanism of this second embodiment applied to a driving gear, first engage an engaging point 311 on each of the axial rods 31 with a fixing hole 611 provided on each driving member 61 (see FIGS. 9 and 10A). The axial rods 31 are then separately guided through the guide rails 211, 221, 231 on the mounting discs 21, 22, 23. Connect the gears 414 to the axial rods 31 by engaging an engaging hole 414a of each gear 414 with the axial rod 31 (see FIG. 9A), such that the gears 414 mesh with the rack 415 mounted on the pivotal shaft 11. Thereafter, connect an end of each tension spring 511 to one corresponding axial rod 31 and guide another end of each tension spring 511 through the fixing bar 222 to one corresponding connecting bar 223. Use fastening means 8, such as screws, to extend through holes 232 provided on the mounting disc 23, which is located at one outer side of the whole speed-changing mechanism, into internally threaded holes 222a provided in the fixing bars 222. Finally, wind the transmission member 7 around the driving members 61.

The second embodiment employs the same operational principle and provides the same effect as those for the first embodiment that has a transmission gear 41 consisting of chains 411, connectors 412 for connecting the chains 411 to the axial rods 31, connecting bars 223 mounted on the mounting discs 22, and fastening members 413 for connecting the chains 411 to the connecting bars 223.

Figure 11:
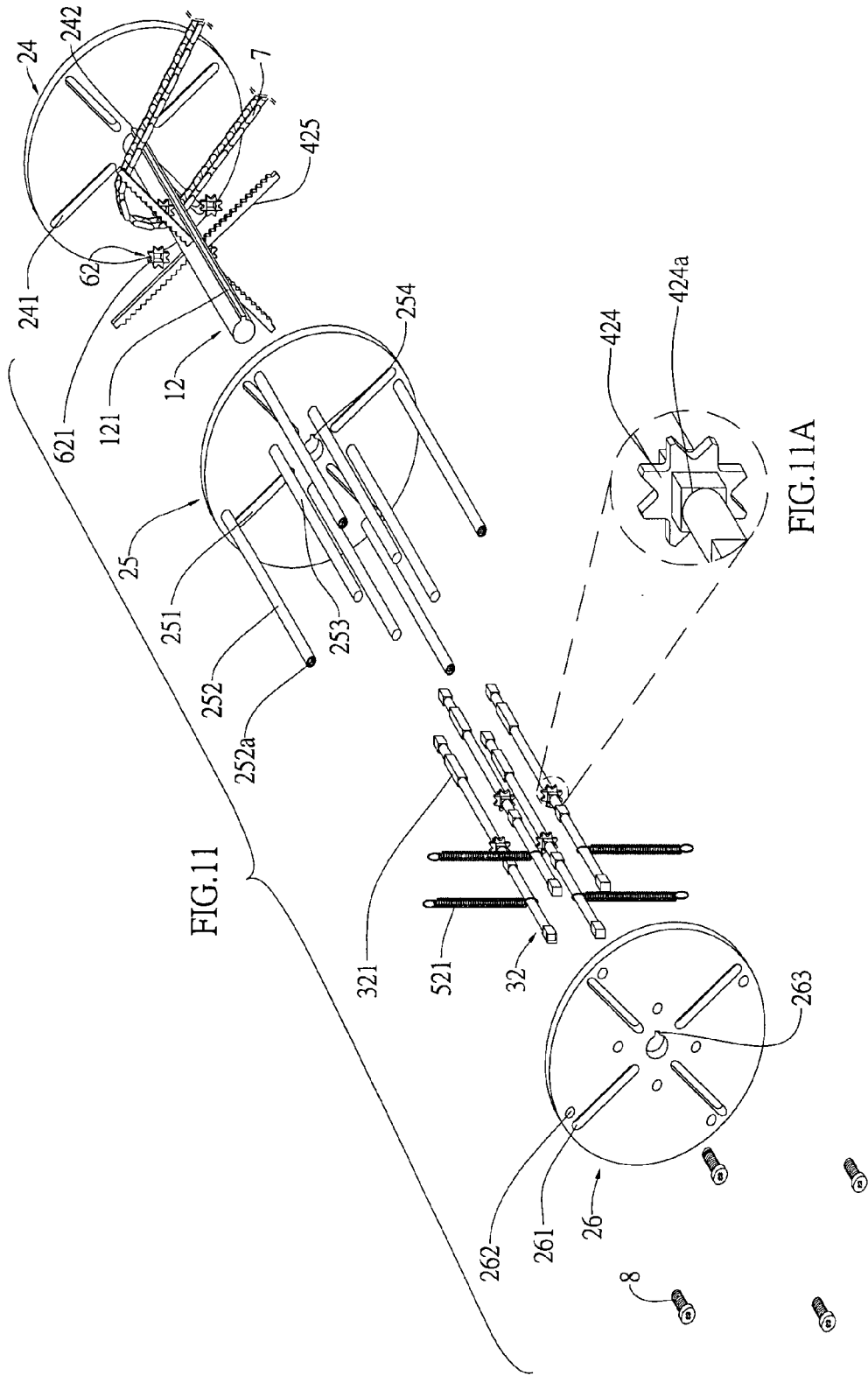
FIG. 11 is an exploded perspective view of the automatic stepless speed-changing mechanism according to the second embodiment of the present invention being applied to a driven gear.
Figure 12:
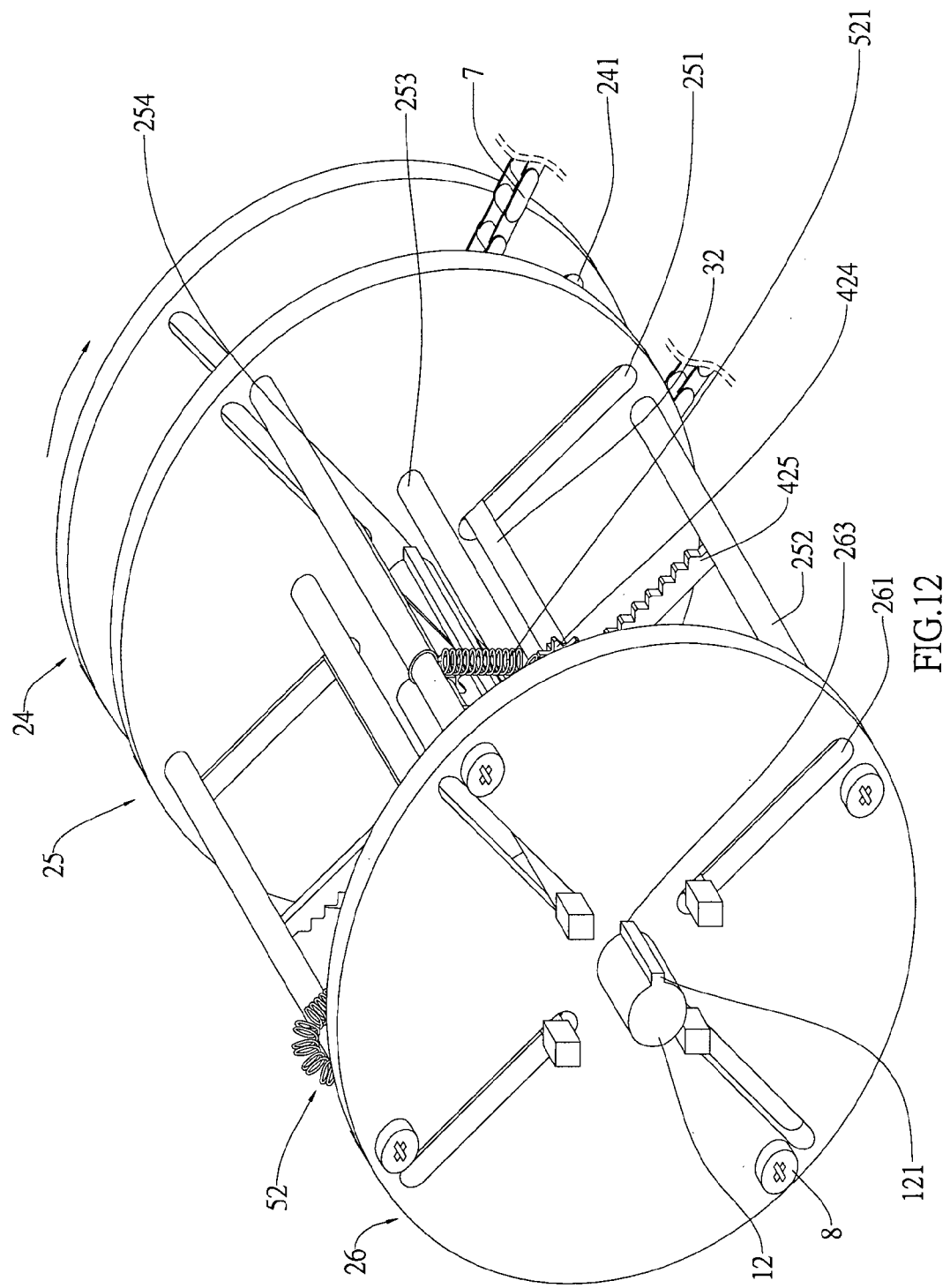
FIG. 12 is an assembled perspective view of FIG. 11.

Please refer to FIGS. 11 and 12 that are exploded and assembled perspective views, respectively, of the automatic stepless speed-changing mechanism according to the second embodiment of the present invention being applied to a driven gear. As shown, this second embodiment being applied to a driven gear is generally structurally similar to the first embodiment, except that a transmission gear 42 thereof includes gears 424 mounted on the axial rods 32 (see FIG. 11A) and a rack 425 mounted on the pivotal shaft 12. A restoring mechanism 52 thereof also includes tension springs 521, fixing bars 252 mounted on the mounting discs 25, and connecting bars 253 mounted on the mounting discs 25, with an end of the tension springs 521 connected to the axial rods 32 and another end passed by the connecting bars 253 to connect to the fixing bars 252. And, a transmission member 7 is wound around driving members 62.

To assemble the speed-changing mechanism of the second embodiment applied to a driven gear, first engage an engaging point 321 on each of the axial rods 32 with a fixing hole 621 provided on each driving member 62. The axial rods 32 are then separately guided through the guide rails 241, 251, 261 provided on the mounting discs 24, 25, 26. Connect the gears 424 to the axial rods 32 by engaging an engaging hole 424a of each gear 424 with the axial rod 32 (see FIG. 11A), such that the gears 424 mesh with the rack 425 mounted on the pivotal shaft 12. Thereafter, connect an end of each tension spring 521 to one corresponding axial rod 32 and guide another end of each tension spring 521 through the connecting bar 253 to one corresponding fixing bar 252. Use fastening means 8, such as screws, to extend through holes 262 provided on the mounting disc 26, which is located at one outer side of the whole speed-changing mechanism, into internally threaded holes 252a provided in the fixing bars 252. Finally, wind the transmission member 7 around the driving members 62.

The second embodiment applied to a driven gear employs the same operational principle and provides the same effect as those for the first embodiment that has a transmission gear 42 consisting of chains 421, connectors 422 for connecting the chains 421 to the axial rods 32, fixing bars 252 mounted on the mounting discs 25, and fastening members 423 for connecting the chains 421 to the fixing bars 252.

Figure 13:
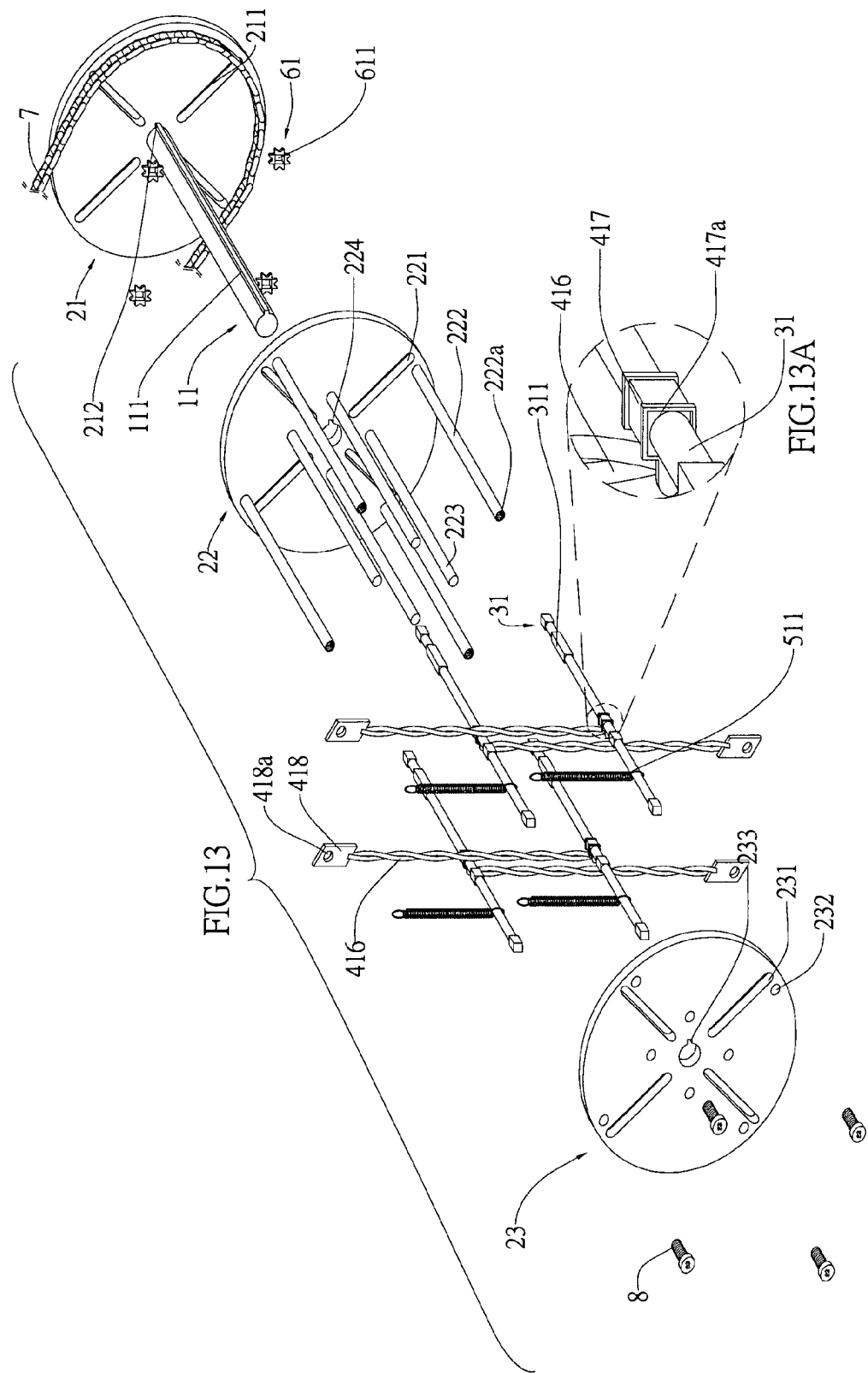
FIG. 13 is an exploded perspective view of an automatic stepless speed-changing mechanism according to a third embodiment of the present invention being applied to a driving gear, wherein steel cables are employed in a transmission gear thereof.
Figure 14:
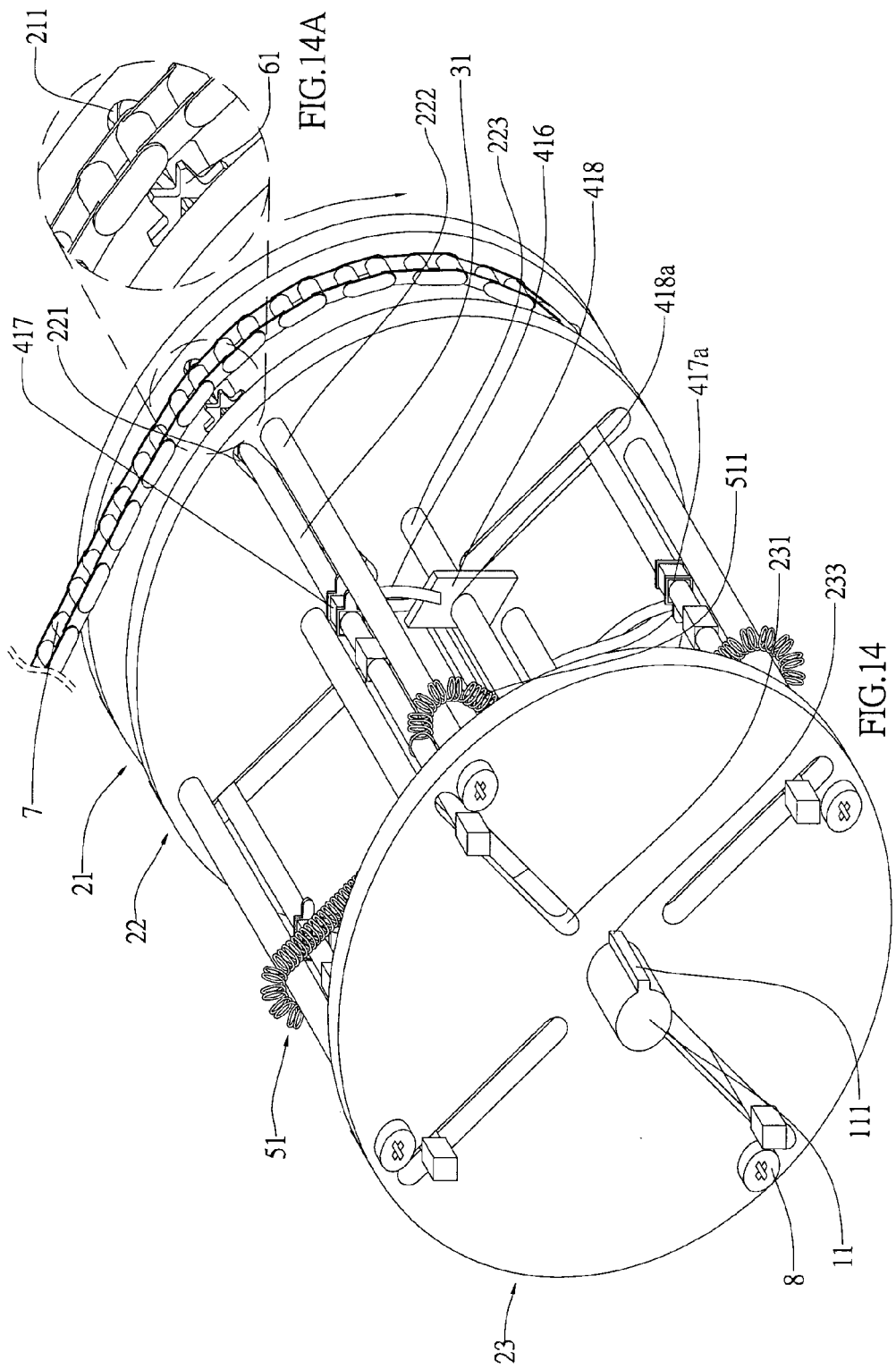
FIG. 14 is an assembled perspective view of FIG. 13.

FIGS. 13 and 14 are exploded and assembled perspective views, respectively, of a speed-changing mechanism according to a third embodiment of the present invention being applied to a driving gear. This third embodiment is structurally similar to the first embodiment, except that a transmission gear 41 thereof includes steel cables 416, connectors 417 for connecting the steel cables 416 to the axial rods 31 (see FIG. 13A), connecting bars 223 mounted on the mounting disc 22, and fastening members 418 for connecting the steel cables 416 to the connecting bars 223, with an end of each steel cable 416 connected to one corresponding axial rod 31 via the connector 417, and another end to one corresponding connecting bar 223 via the fastening member 418. A restoring mechanism 51 thereof also includes tension springs 511, fixing bars 222 mounted on the mounting discs 22, and connecting bars 223 mounted on the mounting discs 22, with an end of the tension springs 511 connected to the axial rods 31 and another end passed by the fixing bars 222 to connect to the connecting bars 223. And, a transmission member 7 is wound around driving members 61 (see FIG. 14A).

To assemble the speed-changing mechanism of this third embodiment applied to a driving gear, first engage an engaging point 311 on each of the axial rods 31 with a fixing hole 611 provided on each driving member 61 (see FIGS. 13 and 14A). The axial rods 31 are then separately guided through the guide rails 211, 221, 231 on the mounting discs 21, 22, 23. Connect the connectors 417 to the axial rods 31 by engaging an engaging hole 417a of each connector 417 with the axial rod 31 (see FIG. 13A). Thereafter, connect an end of each steel cable 416 to one corresponding axial rod 31 via the connector 417 and another end to one corresponding connecting bar 223 via the fastening member 418 by engaging an engaging hole 418a of the fastening member 418 with the connecting bar 223. Thereafter, connect an end of each tension spring 511 to one corresponding axial rod 31 and guide another end of each tension spring 511 through the fixing bar 222 to one corresponding connecting bar 223. Use fastening means 8, such as screws, to extend through holes 232 provided on the mounting disc 23, which is located at one outer side of the whole speed-changing mechanism, into internally threaded holes 222a provided in the fixing bars 222. Finally, wind the transmission member 7 around the driving members 61.

The third embodiment being applied to a driving gear employs the same operational principle and provides the same effect as those for the first embodiment that has a transmission gear 41 consisting of chains 411, connectors 412 for connecting the chains 411 to the axial rods 31, connecting bars 223 mounted on the mounting discs 22, and fastening members 413 for connecting the chains 411 to the connecting bars 223.

Figure 15:
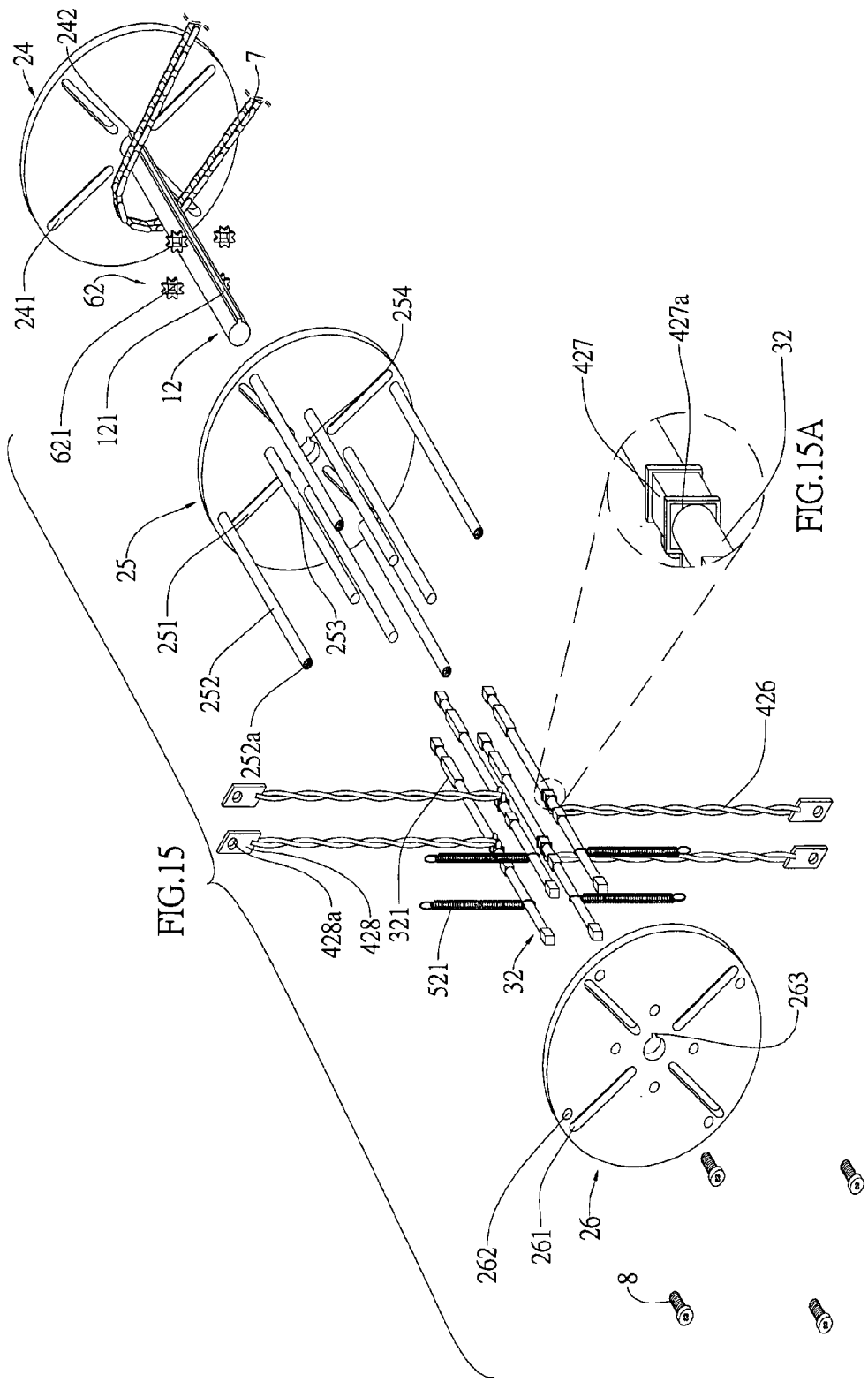
FIG. 15 is an exploded perspective view of the automatic stepless speed-changing mechanism according to the third embodiment of the present invention being applied to a driven gear.
Figure 16:
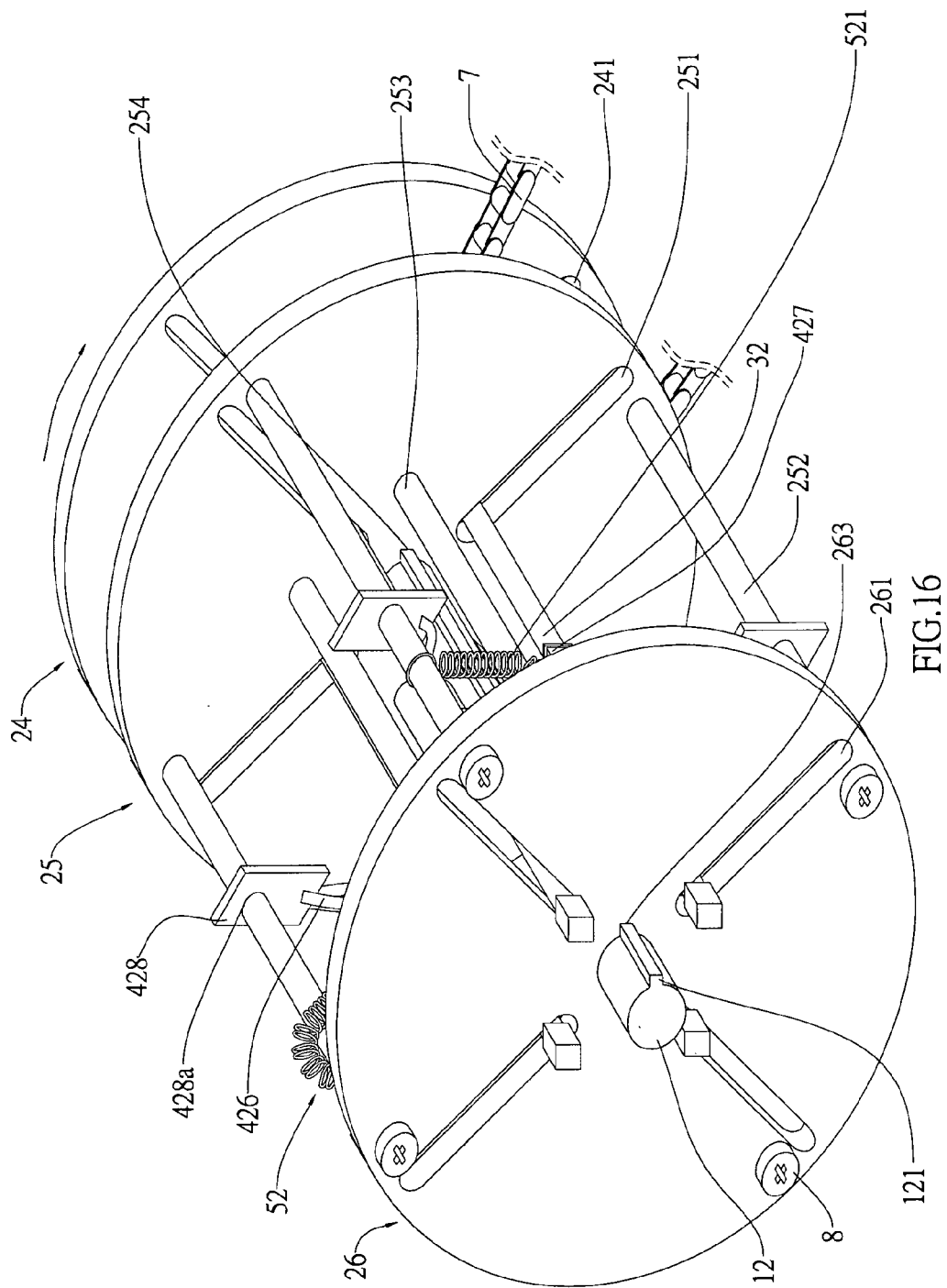
FIG. 16 is an assembled perspective view of FIG. 15.

FIGS. 15 and 16 are exploded and assembled perspective views, respectively, of the speed-changing mechanism according to the third embodiment of the present invention being applied to a driven gear. This third embodiment being applied to a driven gear is structurally similar to the first embodiment, except that a transmission gear 42 thereof includes steel cables 426, connectors 427 for connecting the steel cables 426 to the axial rods 32 (see FIG. 15A), fixing bars 252 mounted on the mounting disc 25, and fastening members 428 for connecting the steel cables 426 to the fixing bars 252, with an end of each steel cable 426 connected to one corresponding axial rod 32 via the connector 427, and another end to one corresponding fixing bar 252 via the fastening member 428. A restoring mechanism 52 thereof also includes tension springs 521, fixing bars 252 mounted on the mounting discs 25, and connecting bars 253 mounted on the mounting discs 25, with an end of the tension springs 521 connected to the axial rods 32 and another end passed by the connecting bars 253 to connect to the fixing bars 252. And, a transmission member 7 is wound around driving members 62.

To assemble the speed-changing mechanism of the third embodiment applied to a driven gear, first engage an engaging point 321 on each of the axial rods 32 with a fixing hole 621 provided on each driving member 62. The axial rods 32 are then separately guided through the guide rails 241, 251, 261 on the mounting discs 24, 25, 26. Connect the connectors 427 to the axial rods 32 by engaging an engaging hole 427a of each connector 427 with the axial rod 32 (see FIG. 15A). Thereafter, connect an end of each steel cable 426 to one corresponding axial rod 32 via the connector 427 and another end to one corresponding fixing bar 252 via the fastening member 428 by engaging an engaging hole 428a of the fastening member 428 with the fixing bar 252. Thereafter, connect an end of each tension spring 521 to one corresponding axial rod 32 and guide another end of each tension spring 521 through the connecting bar 253 to one corresponding fixing bar 252. Use fastening means 8, such as screws, to extend through holes 262 provided on the mounting disc 26, which is located at one outer side of the whole speed-changing mechanism, into internally threaded holes 252a provided in the fixing bars 252. Finally, wind the transmission member 7 around the driving members 62.

The third embodiment being applied to a driven gear employs the same operational principle and provides the same effect as those for the first embodiment that has a transmission gear 42 consisting of chains 421, connectors 422 for connecting the chains 421 to the axial rods 32, fixing bars 252 mounted on the mounting discs 25, and fastening members 423 for connecting the chains 412 to the fixing bars 252.

Figure 17:
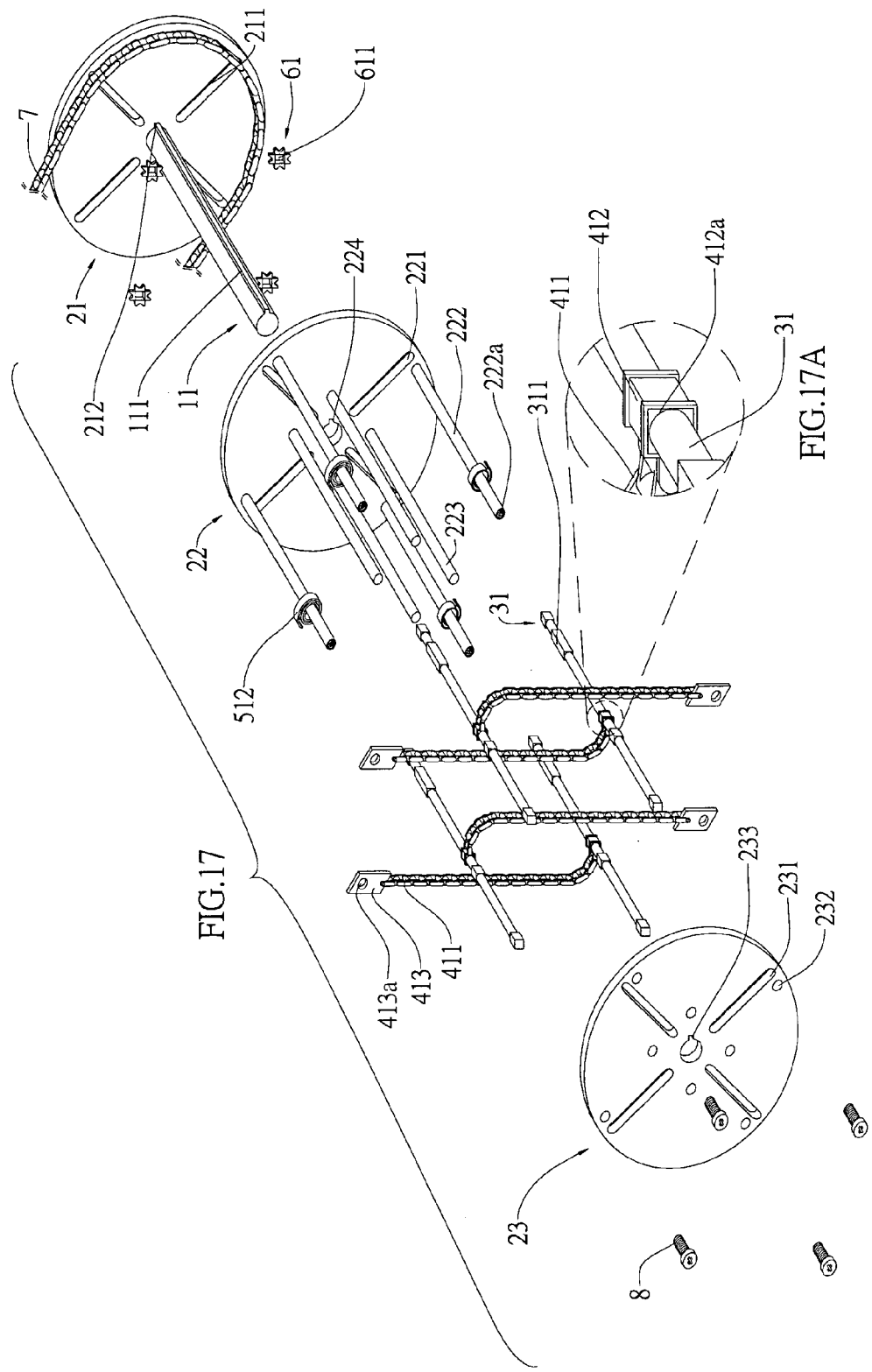
FIG. 17 is an exploded perspective view of an automatic stepless speed-changing mechanism according to a fourth embodiment of the present invention being applied to a driving gear, wherein leaf springs are employed in a restoring mechanism thereof.
Figure 18:
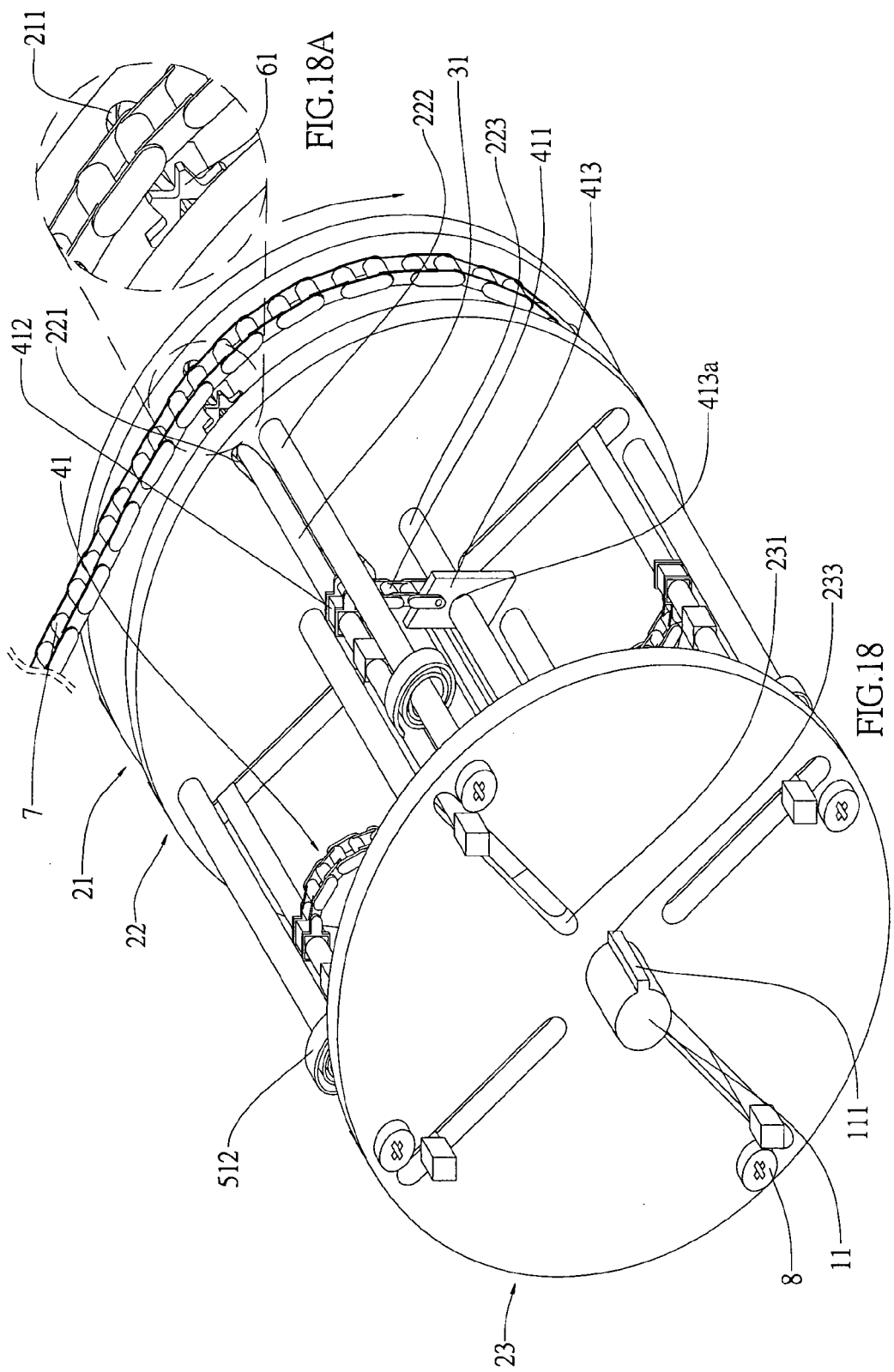
FIG. 18 is an assembled perspective view of FIG. 17.

Please refer to FIGS. 17 and 18 that are exploded and assembled perspective views, respectively, of a speed-changing mechanism according to a fourth embodiment of the present invention being applied to a driving gear. This fourth embodiment being applied to a driving gear is structurally similar to the first embodiment, except that a restoring mechanism 51 thereof includes a plurality of leaf springs 512. As shown, the speed-changing mechanism of the fourth embodiment being applied to a driving gear includes a transmission gear 41 consisting of a plurality of chains 411, connectors 412 for connecting the chains 411 to the axial rods 31 (see FIG. 17A), connecting bars 223 mounted on the mounting disc 22, and fastening members 413 for connecting the chains 411 to the connecting bars 223, with an end of each chain 411 connected to one corresponding axial rod 31 via the connector 412, and another end to one corresponding connecting bar 223 via the fastening member 413; a restoring mechanism 51 consisting of a plurality of leaf springs 512 and fixing bars 222 mounted on the intermediate mounting disc 22, with an end of each leaf spring 512 connected to one corresponding axial rod 31 and another end to one corresponding fixing bar 222; and a transmission member 7 wound around driving members 61 (see FIG. 18A).

To assemble the speed-changing mechanism of this fourth embodiment applied to a driving gear, first engage an engaging point 311 on each of the axial rods 31 with a fixing hole 611 provided on each driving member 61 (see FIGS. 17 and 18A). The axial rods 31 are then separately guided through the guide rails 211, 221, 231 on the mounting discs 21, 22, 23. Connect the connectors 412 to the axial rods 31 by engaging an engaging hole 412a of each connector 412 with the axial rod 31 (see FIG. 17A). Thereafter, connect an end of each chain 411 to one corresponding axial rod 31 via the connector 412 and another end to one corresponding connecting bar 223 via the fastening member 413 by engaging an engaging hole 413a of the fastening member 413 with the connecting bar 223. Thereafter, connect an end of each leaf spring 512 to one corresponding axial rod 31 and another end to one corresponding fixing bar 222. Use fastening means 8, such as screws, to extend through holes 232 provided on the mounting disc 23, which is located at one outer side of the whole speed-changing mechanism, into internally threaded holes 222a provided in the fixing bars 222. Finally, wind the transmission member 7 around the driving members 61.

The fourth embodiment being applied to a driving gear employs the same operational principle and provides the same effect as those for the first embodiment that has a restoring mechanism 51 consisting of tension springs 511, fixing bars 222 mounted on the intermediate mounting disc 22, and connecting bars 223 mounted on the intermediate mounting discs 22.

Figures 19, 19A:
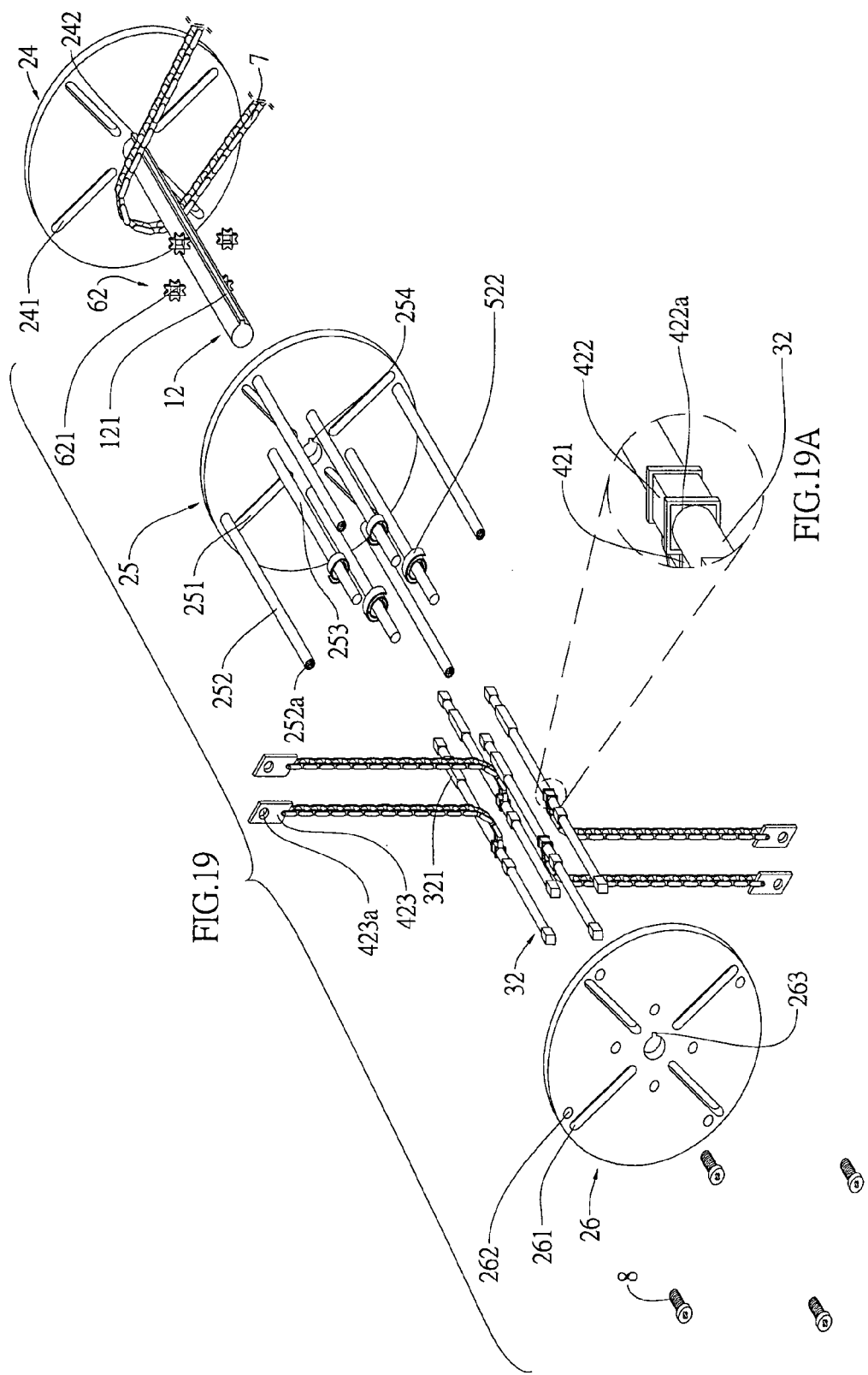
FIG. 19 is an exploded perspective view of the automatic stepless speed-changing mechanism according to the fourth embodiment of the present invention being applied to a driven gear.
FIG. 19A is an enlarged view of the encircled area of FIG. 19 to better show a structure thereat.
Figure 20:
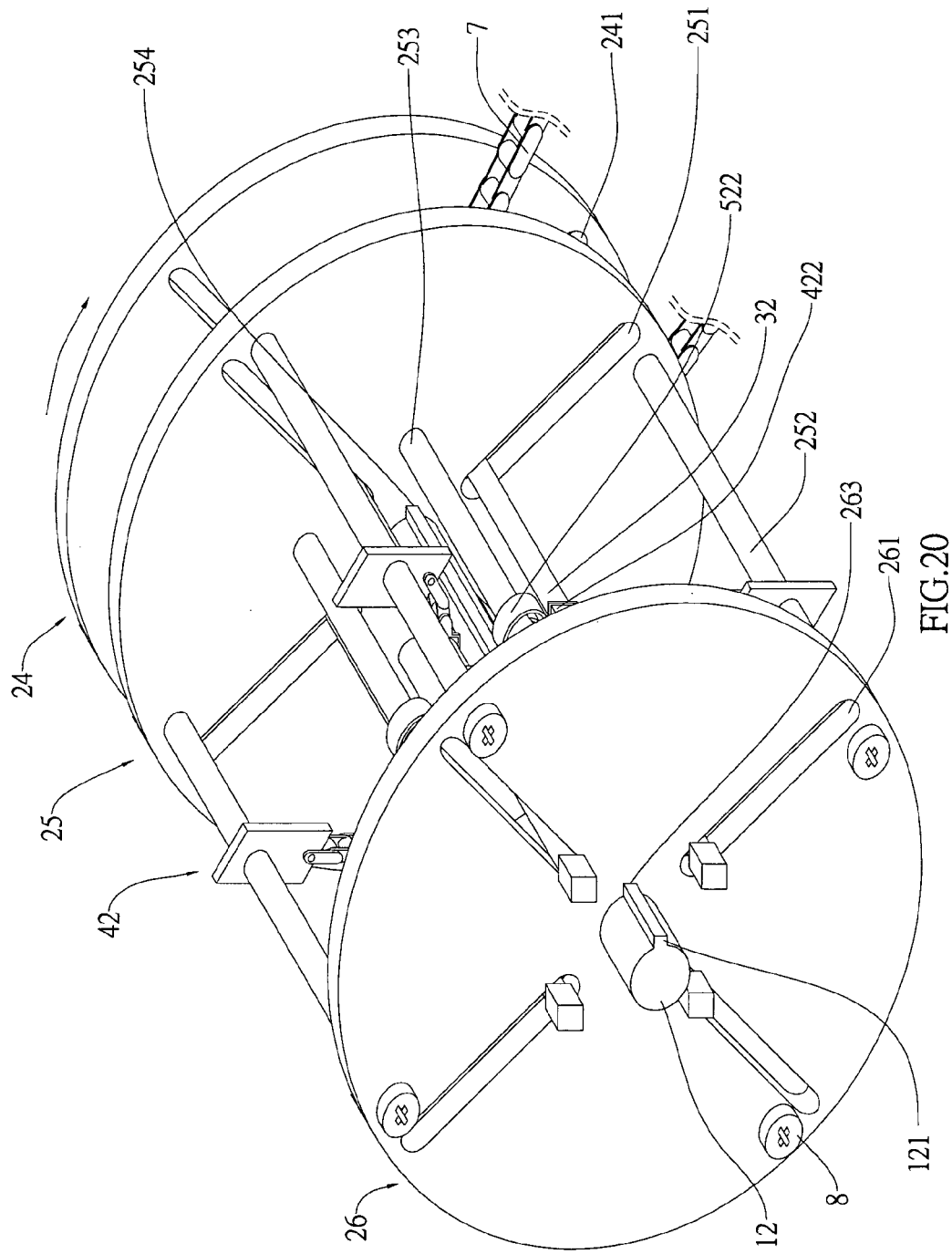
FIG. 20 is an assembled perspective view of FIG. 19.

Please refer to FIGS. 19 and 20 that are exploded and assembled perspective views, respectively, of the speed-changing mechanism according to the fourth embodiment of the present invention being applied to a driven gear. This fourth embodiment being applied to a driven gear is structurally similar to the first embodiment, except that a restoring mechanism 52 thereof includes a plurality of leaf springs 522. As shown, the speed-changing mechanism of the fourth embodiment being applied to a driven gear includes a transmission gear 42 consisting of a plurality of chains 421, connectors 422 for connecting the chains 421 to the axial rods 32 (see FIG. 19A), fixing bars 252 mounted on the intermediate mounting disc 25, and fastening members 423 for connecting the chains 421 to the fixing bars 252, with an end of each chain 421 connected to one corresponding axial rod 32 via the connector 422, and another end to one corresponding fixing bar 252 via the fastening member 423; a restoring mechanism 52 consisting of a plurality of leaf springs 522 and connecting bars 253 mounted on the intermediate mounting disc 25, with an end of each leaf spring 522 connected to one corresponding axial rod 32 and another end to one corresponding connecting bar 253; and a transmission member 7 wound around driving members 62.

To assemble the speed-changing mechanism of the fourth embodiment applied to a driven gear, first engage an engaging point 321 on each of the axial rods 32 with a fixing hole 621 provided on each driving member 62. The axial rods 32 are then separately guided through the guide rails 241, 251, 261 on the mounting discs 24, 25, 26. Connect the connectors 422 to the axial rods 32 by engaging an engaging hole 422a of each connector 422 with the axial rod 32 (see FIG. 19A).

Thereafter, connect an end of each chain 421 to one corresponding axial rod 32 via the connector 422 and another end to one corresponding fixing bar 252 via the fastening member 423 by engaging an engaging hole 423a of the fastening member 423 with the fixing bar 252. Thereafter, connect an end of each leaf spring 522 to one corresponding axial rod 32 and another end to one corresponding connecting bar 253. Use fastening means 8, such as screws, to extend through holes 262 provided on the mounting disc 26, which is located at one outer side of the whole speed-changing mechanism, into internally threaded holes 252a provided in the fixing bars 252. Finally, wind the transmission member 7 around the driving members 62.

The fourth embodiment being applied to a driven gear employs the same operational principle and provides the same effect as those for the first embodiment that has a restoring mechanism 52 consisting of tension springs 521, fixing bars 252 mounted on the intermediate mounting disc 25, and connecting bars 253 mounted on the intermediate mounting discs 25.

Figure 21:
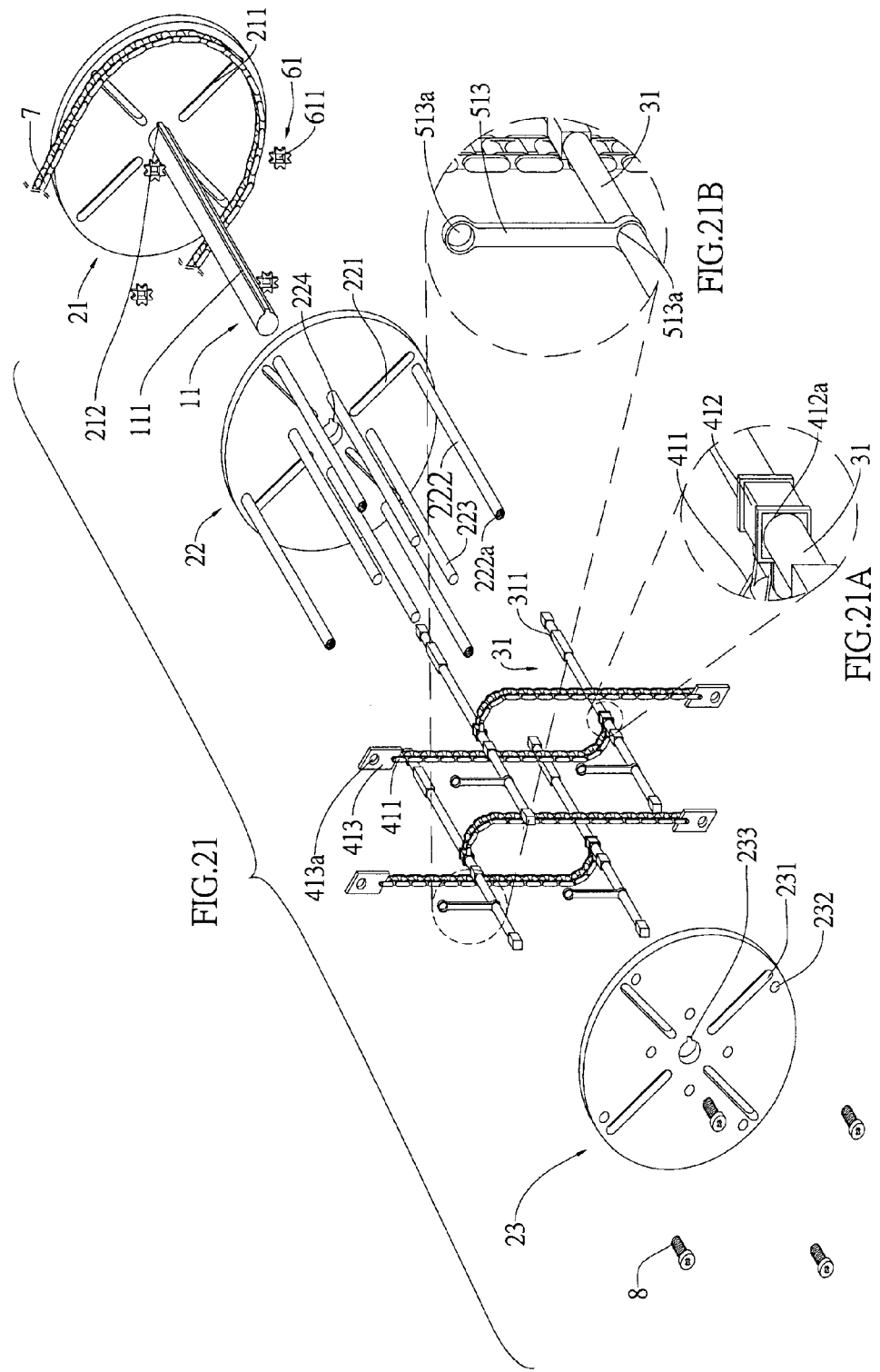
FIG. 21 is an exploded perspective view of an automatic stepless speed-changing mechanism according to a fifth embodiment of the present invention being applied to a driving gear, wherein elastomer members are employed in a restoring mechanism thereof.
Figure 22:
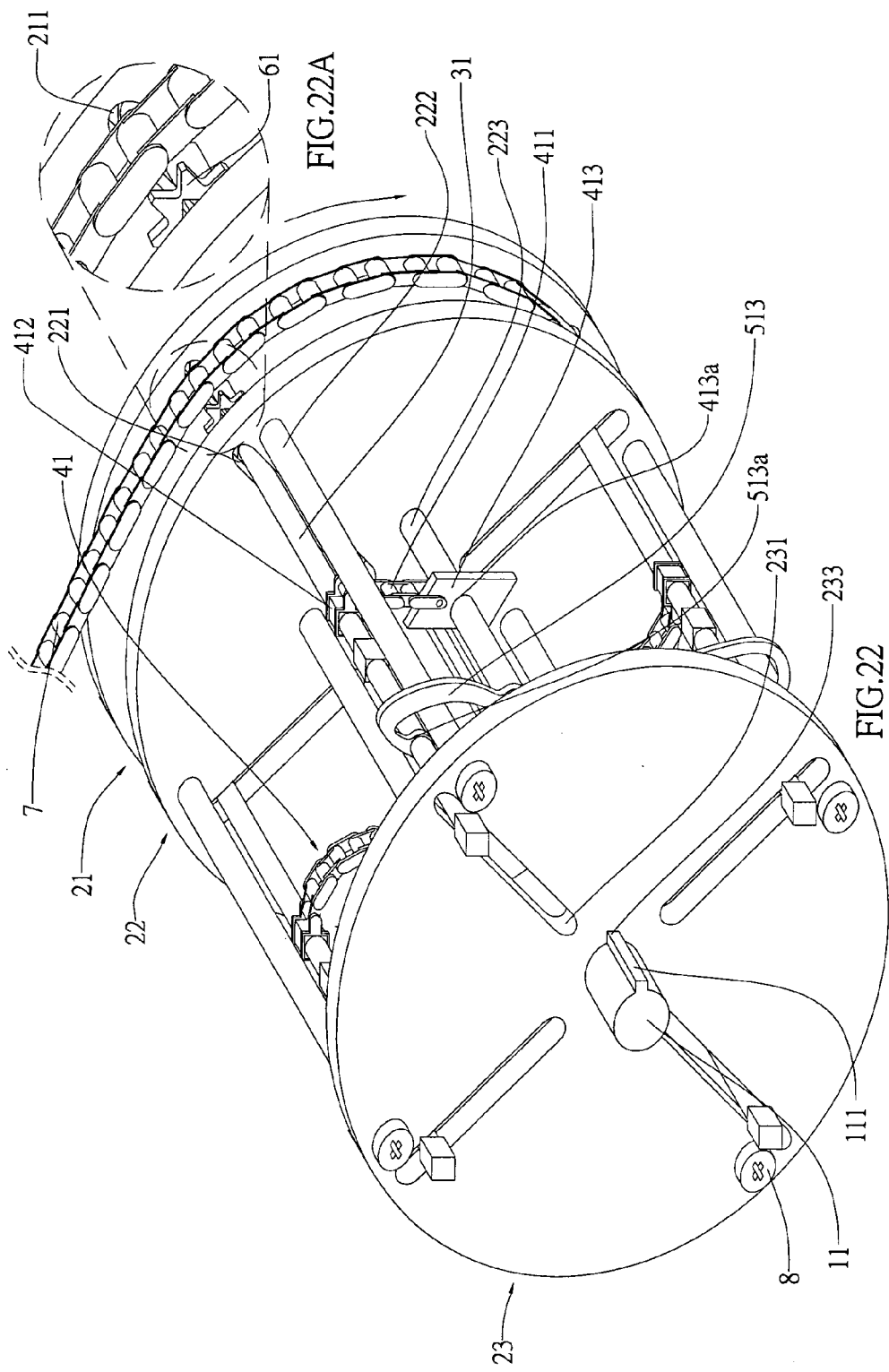
FIG. 22 is an assembled perspective view of FIG. 21.

Please refer to FIGS. 21 and 22 that are exploded and assembled perspective views, respectively, of a speed-changing mechanism according to a fifth embodiment of the present invention being applied to a driving gear. This fifth embodiment being applied to a driving gear is structurally similar to the first embodiment, except that a restoring mechanism 51 thereof includes a plurality of elastomer members 513. As shown, the speed-changing mechanism of the fifth embodiment being applied to a driving gear includes a transmission gear 41 consisting of a plurality of chains 411, connectors 412 for connecting the chains 411 to the axial rods 31 (see FIG. 21A), connecting bars 223 mounted on the intermediate mounting disc 22, and fastening members 413 for connecting the chains 411 to the connecting bars 223, with an end of each chain 411 connected to one corresponding axial rod 31 via the connector 412, and another end to one corresponding connecting bar 223 via the fastening member 413; a restoring mechanism 51 consisting of a plurality of elastomer members 513, fixing bars 222 mounted on the intermediate mounting disc 22, and connecting bars 223 mounted on the intermediate mounting disc 22, with an end of each elastomer member 513 connected to one corresponding axial rod 31 (see FIG. 21B) and another end passed by the fixing bar 222 to connect to one corresponding connecting bar 223; and a transmission member 7 wound around driving members 61 (see FIG. 22A)

To assemble the speed-changing mechanism of this fifth embodiment applied to a driving gear, first engage an engaging point 311 on each of the axial rods 31 with a fixing hole 611 provided on each driving members 61 (see FIGS. 21 and 22A). The axial rods 31 are then separately guided through the guide rails 211, 221, 231 on the mounting discs 21, 22, 23. Connect the connectors 412 to the axial rods 31 by engaging an engaging hole 412a of each connector 412 with the axial rod 31 (see FIG. 21A). Thereafter, connect an end of each chain 411 to one corresponding axial rod 31 via the connector 412 and another end to one corresponding connecting bar 223 via the fastening member 413 by engaging an engaging hole 413a of the fastening member 413 with the connecting bar 223. Thereafter, connect a through hole 513a provided at an end of each elastomer member 513 to one corresponding axial rod 31 (see FIG. 21B), and guide another through holes 513a provided at another end of each elastomer member 513 through the fixing bar 222 to connect to one corresponding connecting bar 223. Use fastening means 8, such as screws, to extend through holes 232 provided on the mounting disc 23, which is located at one outer side of the whole speed-changing mechanism, into internally threaded holes 222a provided in the fixing bars 222. Finally, wind the transmission member 7 around the driving members 61.

The fifth embodiment being applied to a driving gear employs the same operational principle and provides the same effect as those for the first embodiment that has a restoring mechanism 51 consisting of tension springs 511, fixing bars 222 mounted on the intermediate mounting disc 22, and connecting bars 223 mounted on the intermediate mounting discs 22.

Figure 23:
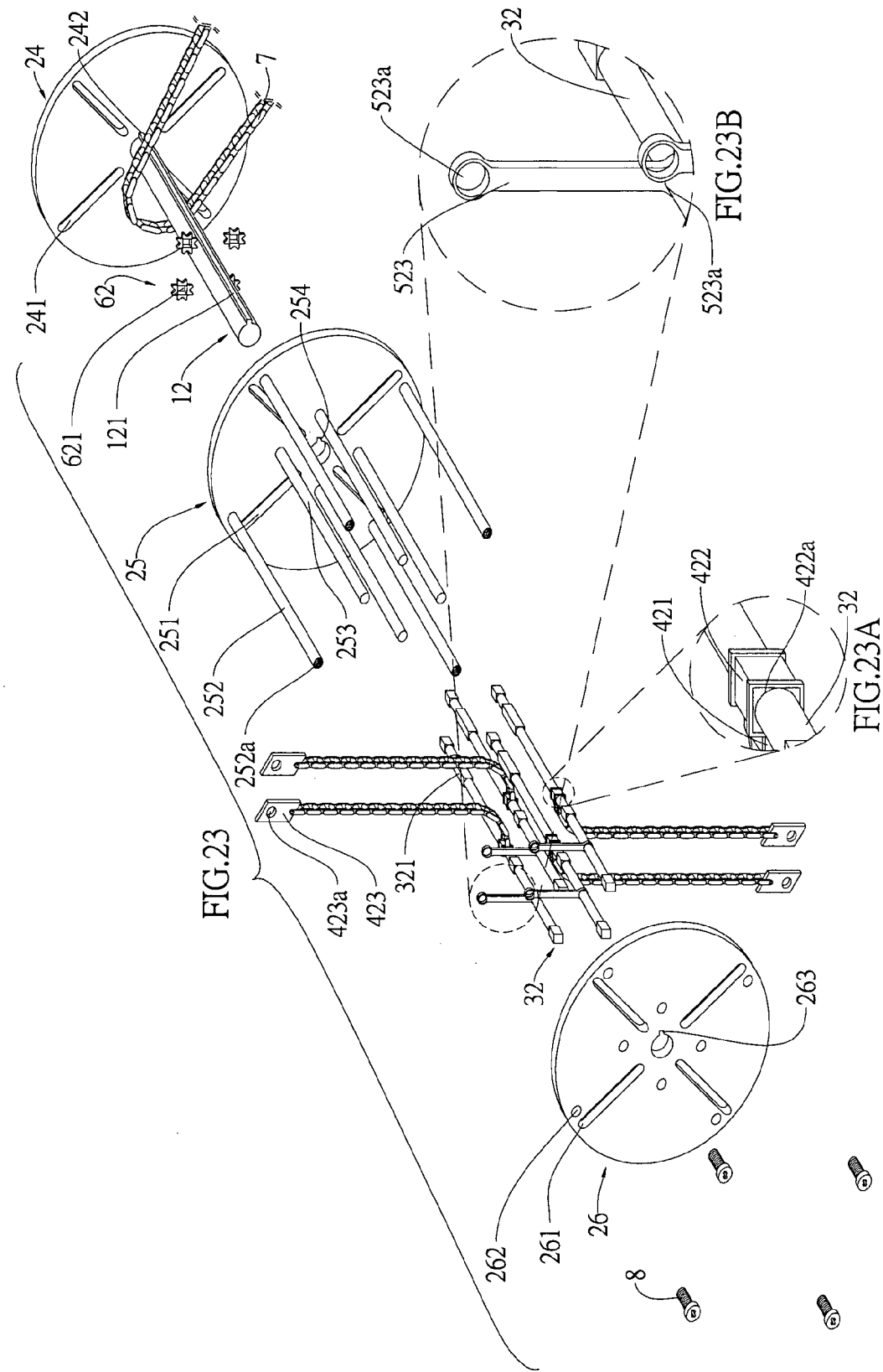
FIG. 23 is an exploded perspective view of the automatic stepless speed-changing mechanism according to the fifth embodiment of the present invention being applied to a driven gear.
Figure 24:
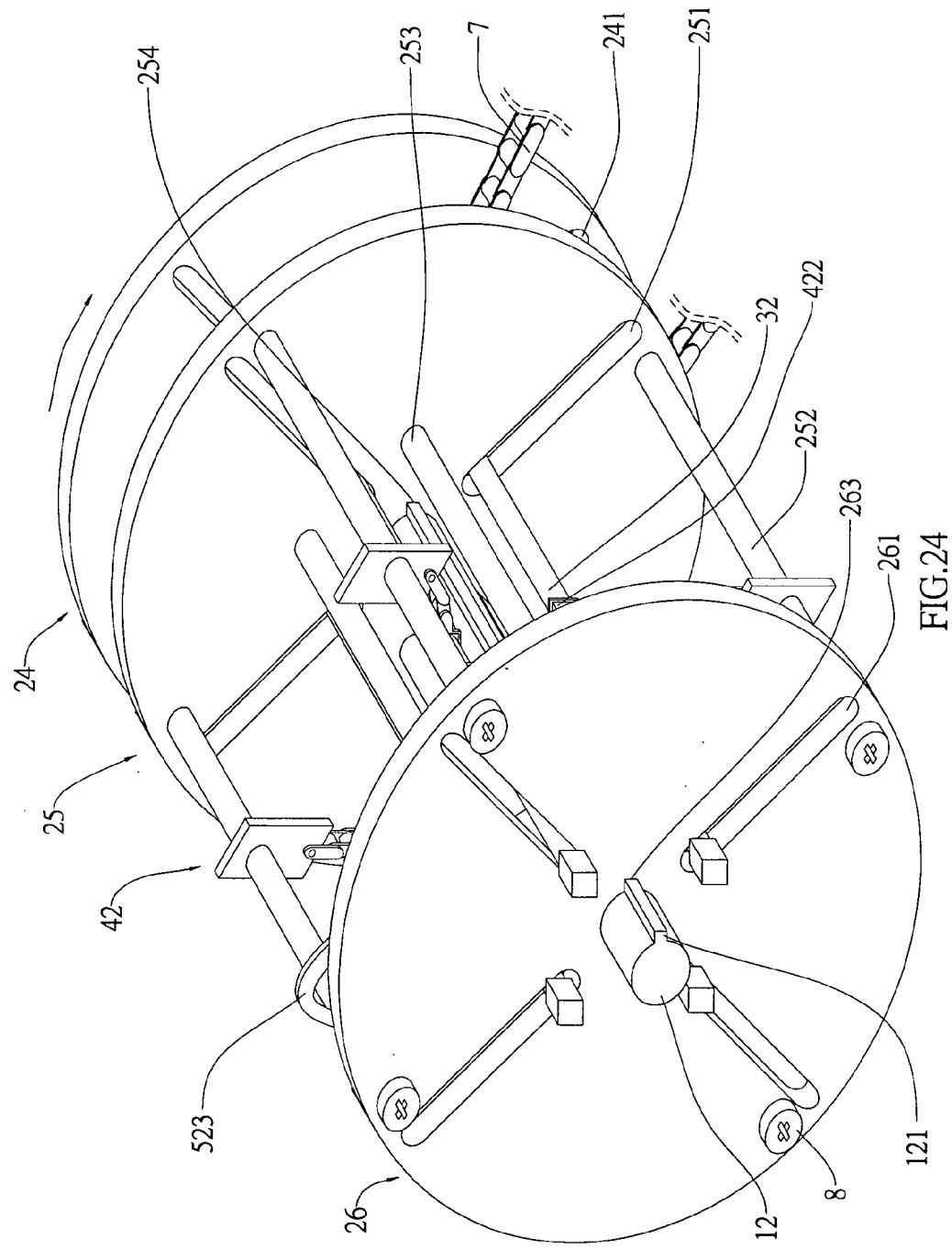
FIG. 24 is an assembled perspective view of FIG. 23.

Please refer to FIGS. 23 and 24 that are exploded and assembled perspective views, respectively, of the speed-changing mechanism according to the fifth embodiment of the present invention being applied to a driven gear. This fifth embodiment being applied to a driven gear is structurally similar to the first embodiment, except that a restoring mechanism 52 thereof includes a plurality of elastomer members 523. As shown, the speed-changing mechanism of the fifth embodiment being applied to a driven gear includes a transmission gear 42 consisting of a plurality of chains 421, connectors 422 for connecting the chains 421 to the axial rods 32 (see FIG. 23A), fixing bars 252 mounted on the intermediate mounting disc 25, and fastening members 423 for connecting the chains 421 to the fixing bars 252, with an end of each chain 421 connected to one corresponding axial rod 32 via the connector 422, and another end to one corresponding fixing bar 252 via the fastening member 423; a restoring mechanism 52 consisting of a plurality of elastomer members 523, fixing bars 252 mounted on the intermediate mounting disc 25, and connecting bars 253 mounted on the intermediate mounting disc 25, with an end of each elastomer member 523 connected to one corresponding axial rod 32 (see FIG. 23B) and another end passed by the connecting bar 253 to connect to one corresponding fixing bar 252; and a transmission member 7 wound around driving members 62.

To assemble the speed-changing mechanism of the fifth embodiment applied to a driven gear, first engage an engaging point 321 on each of the axial rods 32 with a fixing hole 621 provided on each driving member 62. The axial rods 32 are then separately guided through the guide rails 241, 251, 261 on the mounting discs 24, 25, 26. Connect the connectors 422 to the axial rods 32 by engaging an engaging hole 422a of each connector 422 with the axial rod 32 (see FIG. 23A). Thereafter, connect an end of each chain 421 to one corresponding axial rod 32 via the connector 422 and another end to one corresponding fixing bar 252 via the fastening member 423 by engaging an engaging hole 423a of the fastening member 423 with the fixing bar 252. Thereafter, connect a through hole 523a provided at an end of each elastomer member 523 to one corresponding axial rod 32 (see FIG. 23B), and guide another through holes 523a provided at another end of each elastomer member 523 through the connecting bar 253 to connect to one corresponding fixing bar 252. Use fastening means 8, such as screws, to extend through holes 262 provided on the mounting disc 26, which is located at one outer side of the whole speed-changing mechanism, into internally threaded holes 252a provided in the fixing bars 252. Finally, wind the transmission member 7 around the driving members 62.

The fifth embodiment being applied to a driven gear employs the same operational principle and provides the same effect as those for the first embodiment that has a restoring mechanism 52 consisting of tension springs 521, fixing bars 252 mounted on the intermediate mounting disc 25, and connecting bars 253 mounted on the intermediate mounting discs 25.

In the above-described embodiments, four sets of axial rods 31, 32, transmission gears 41, 42, restoring mechanisms 51, 52, and driving members 61, 62 are illustrated in the drawings. However, it is understood the number of sets of these components may be increased or decreased, depending on actual conditions. Similarly, in the above-described embodiments, the guide rails 211, 221, 231 and 241, 251, 261 illustrated in the drawings are radially extended slots. However, it is understood the guide rails may be of any other shape, depending on actual conditions.

Figure 25:
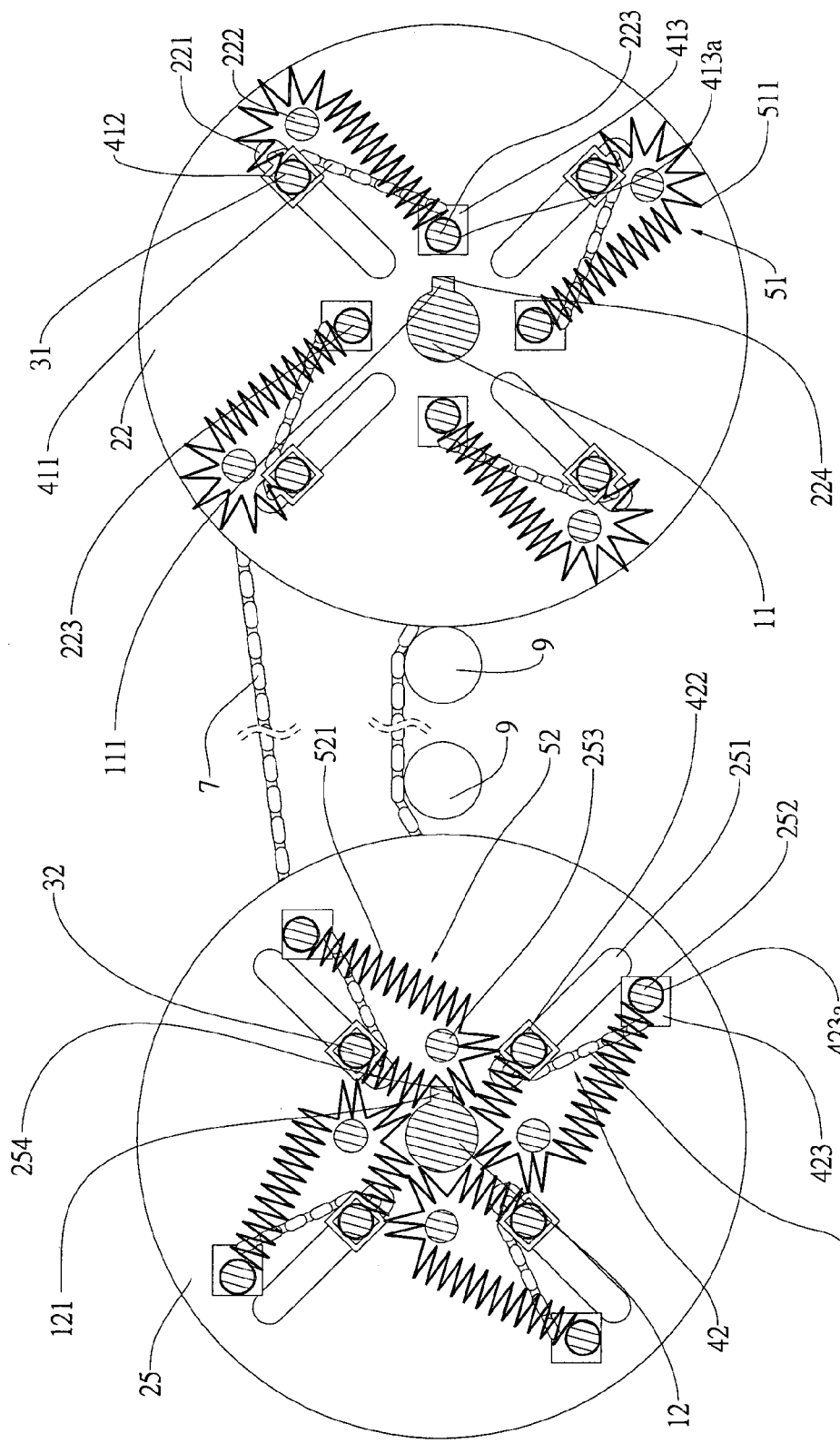
FIG. 25 is a sectioned side view taken along line 25—25 of FIGS. 2 and 4, with tension springs thereof in an initial state and rollers provided between two pivotal shafts thereof.
Figure 26:
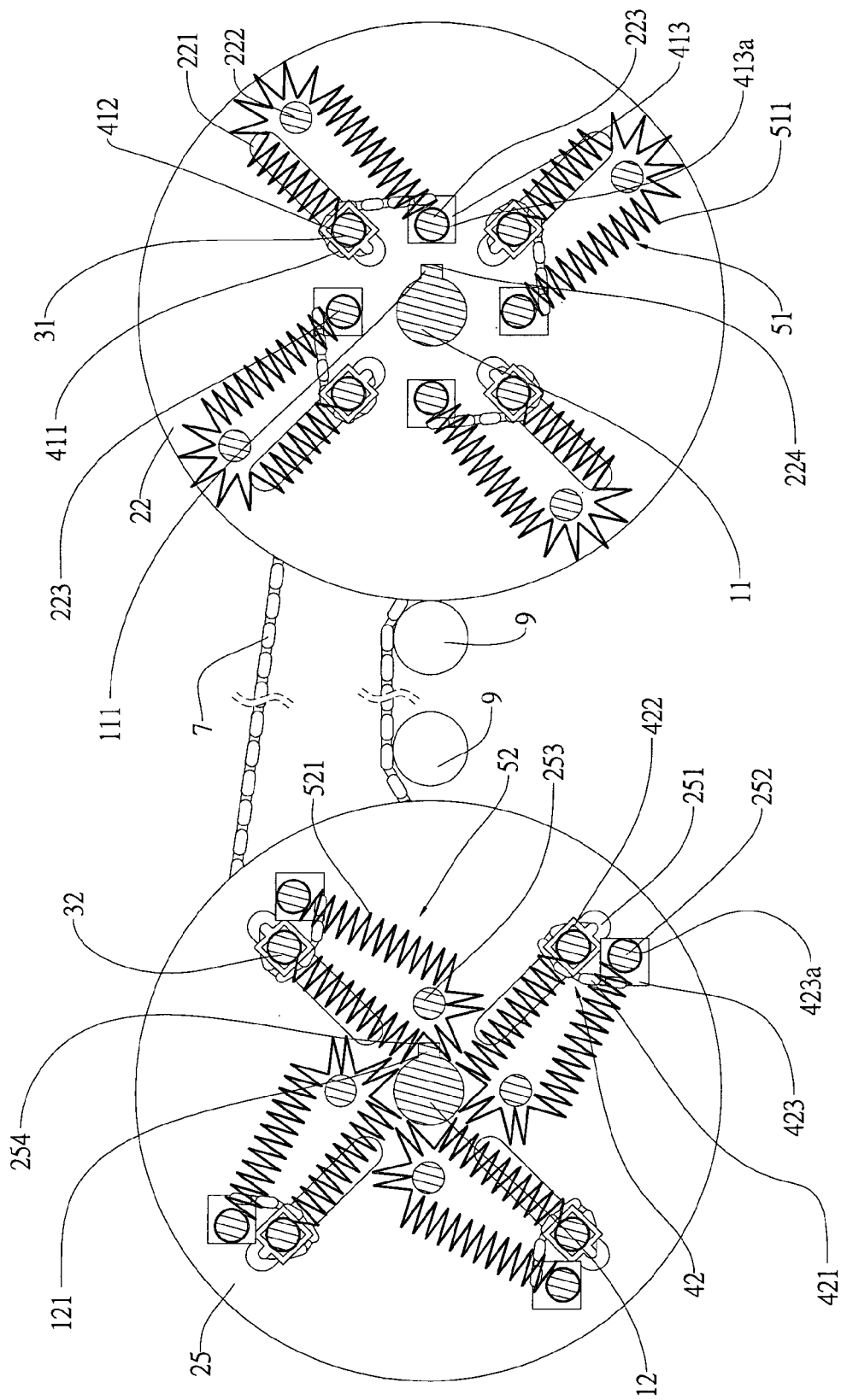
FIG. 26 is a sectioned side view taken along line 26—26 of FIGS. 2 and 4, with tension springs thereof in an operating state and rollers provided between two pivotal shafts thereof.

Please refer to FIGS. 25 and 26 that are sectioned side views taken along line 25—25 and line 26—26, respectively, of FIGS. 2 and 4, with tension springs thereof in initial and operating states, respectively. As shown, the transmission member 7 is maintained at a required tightness by passing it around rollers 9 provided between the pivotal shafts 11, 12 with axes of the rollers 9 and of the pivotal shafts 11, 12 located in the same horizontal plane.

Moreover, in the speed-changing mechanism of the present invention, the driving members 61, 62 and the transmission member 7 are gears and chains, respectively, and a friction coefficient in this type of transmission structure is smaller than that existing in other types of transmission structure. Therefore, it is not necessary to add heat-radiating oil to the transmission structure of the present invention.

The present invention has been described with a preferred embodiment thereof and it is understood that many changes and modifications in the described embodiment can be carried out without departing from the scope and the spirit of the invention as defined by the appended claims.

What is claimed is:

1. An automatic stepless speed-changing mechanism, comprising a pivotal shaft, a plurality of mounting discs mounted along said pivotal shaft and provided with a plurality of guide rails, a plurality of axial rods separately axially extended through said guide rails and adapted to slide and rotate within said guide rails, a transmission gear, a restoring mechanism, and driving members mounted on said axial rods, and a transmission member wound around said driving members, such that said axial rods may slide within said guide rails provided on said mounting discs; wherein said transmission gear includes a plurality of chains, connectors for connecting said chains to said axial rods, connecting bars mounted on an intermediate one of said mounting discs, and fastening members for connecting said chains to said connecting bars.

2. The automatic stepless speed-changing mechanism as claimed in claim 1, wherein said guide rails are radially extended slots.

3. The automatic stepless speed-changing mechanism as claimed in claim 1, wherein each of said chains is connected at an end to a corresponding one of said axial rods via one of said connectors, and at another end to a corresponding one of said connecting bars via one of said fastening members, so that said axial rods are brought by said chains to rotate and slide within said guide rails.

4. The automatic stepless speed-changing mechanism as claimed in claim 3, wherein said connector is provided with an engaging hole for engaging with said axial rod.

5. The automatic stepless speed-changing mechanism as claimed in claim 3, wherein said fastening member is provided with an engaging hole for engaging with said connecting bar.

6. The automatic stepless speed-changing mechanism as claimed in claim 1, wherein said transmission member is maintained at a required tightness by passing said transmission member around rollers that have axes located in a horizontal plane that also contains an axis of said pivotal shaft.

7. The automatic stepless speed-changing mechanism as claimed in claim 1, wherein said restoring mechanism includes a plurality of tension springs, fixing bars mounted on said intermediate one of said mounting discs, and said connecting bars mounted on said intermediate mounting disc.

8. The automatic stepless speed-changing mechanism as claimed in claim 7, wherein each of said tension springs has an end connected to a corresponding one of said axial rods, and another end passed by said fixing bar to connect to a corresponding one of said connecting bars, so that said axial rods are brought by said tension springs to rotate and slide within said guide rails.

9. The automatic stepless-changing mechanism as claimed in claim 7, wherein each of said tension springs has an end connected to a corresponding one of said axial rods, and another end passed by said connecting bar to connect to a corresponding one of said fixing bars, so that said axial rods are brought by said tension springs to rotate and slide within said guide rails.

10. The automatic stepless speed-changing mechanism as claimed in claim 1, wherein said restoring mechanism includes a plurality of elastomer members, fixing bars mounted on said intermediate one of said mounting discs, and said connecting bars mounted on said intermediate mounting disc.

11. The automatic stepless speed-changing mechanism as claimed in claim 10, wherein each of said elastomer members has an end connected to a corresponding one of said axial rods, and another end passed by said fixing bar to connect to a corresponding one of said connecting bars, so that said axial rods are brought by said elastomer members to rotate and slide within said guide rails.

12. The automatic stepless speed-changing mechanism as claimed in claim 10, wherein each of said elastomer members has an end connected to a corresponding one of said axial rods, and another end passed by said connecting bar to connect to a corresponding one of said fixing bars, so that said axial rods are brought by said elastomer members to rotate and slide within said guide rails.

13. An automatic stepless speed-changing mechanism, comprising a pivotal shaft, a plurality of mounting discs mounted along said pivotal shaft and provided with a plurality of guide rails, a plurality of axial rods separately axially extended through said guide rails and adapted to slide and rotate within said guide rails, a transmission gear, a restoring mechanism, and driving members mounted on said axial rods, and a transmission member wound around said driving members, such that said axial rods may slide within said guide rails provided on said mounting discs, wherein said transmission gear includes a plurality of chains, connectors for connecting said chains to said axial rods, fixing bars mounted on an intermediate one of said mounting discs, and fastening members for connecting said chains to said fixing bars.

14. The automatic stepless speed-changing mechanism as claimed in claim 13, wherein each of said chains is connected at an end to a corresponding one of said axial rods via one of said connectors, and at another end to a corresponding one of said fixing bars via one of said fastening members, so that said axial rods are brought by said chains to rotate and slide within said guide rails.

15. The automatic stepless speed-changing mechanism as claimed in claim 14, wherein said connector is provided with an engaging hole for engaging with said axial rod.

16. The automatic stepless speed-changing mechanism as claimed in claim 14, wherein said fastening member is provided with an engaging hole for engaging with said fixing bar.

* * * * *